United States Patent
Osawa

(10) Patent No.: US 10,759,120 B2
(45) Date of Patent: Sep. 1, 2020

(54) SHAPING METHOD AND SHAPING APPARATUS

(71) Applicant: CANON KABUSHIKI KAISHA, Tokyo (JP)

(72) Inventor: Hidefumi Osawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/208,845

(22) Filed: Dec. 4, 2018

(65) Prior Publication Data

US 2019/0105845 A1     Apr. 11, 2019

Related U.S. Application Data

(63) Continuation of application No. PCT/JP2017/020207, filed on May 31, 2017.

(30) Foreign Application Priority Data

Jun. 9, 2016  (JP) ................. 2016-115704

(51) Int. Cl.
*B33Y 50/02* (2015.01)
*B33Y 30/00* (2015.01)
(Continued)

(52) U.S. Cl.
CPC .......... *B29C 64/393* (2017.08); *B29C 64/386* (2017.08); *B33Y 10/00* (2014.12);
(Continued)

(58) Field of Classification Search
CPC ....... B22F 3/1055; B33Y 50/02; B33Y 30/00; B33Y 10/00; B33Y 50/00; B29C 64/393;
(Continued)

(56) References Cited

U.S. PATENT DOCUMENTS

| | | | |
|---|---|---|---|
| 9,633,470 B2 | 4/2017 | Sakurai et al. | |
| 10,155,273 B1 * | 12/2018 | Jessen | B29C 64/40 |
| 2016/0133050 A1 | 5/2016 | Sakurai et al. | |
| 2016/0297147 A1 | 10/2016 | Osawa | |

(Continued)

FOREIGN PATENT DOCUMENTS

| | | | |
|---|---|---|---|
| JP | 2012-096426 A | 5/2012 | |
| JP | 2012-236288 A | 12/2012 | |

(Continued)

OTHER PUBLICATIONS

Dec. 20, 2018 International Preliminary Report on Patentability in International Patent Appln. No. PCT/JP2017/020207.

(Continued)

*Primary Examiner* — Michael J Brown
(74) *Attorney, Agent, or Firm* — Venable LLP

(57) ABSTRACT

A shaping method for performing shaping by sequentially stacking a shaping material on a stage on the basis of slice data, the shaping method includes: a step of obtaining slice data by slicing data on a three-dimensional model of a shaping target into a plurality of layers in a predetermined direction; and a step of sequentially stacking the shaping material on the basis of the obtained slice data for the plurality of layers, wherein in a case where a change instruction to change the data on the three-dimensional model of the shaping target is received during shaping, a processing process corresponding to the change instruction is performed on remaining slice data to be used for the shaping after the change instruction among the slice data for the plurality of layers, and the shaping is continued using the remaining slice data after the processing process.

9 Claims, 21 Drawing Sheets

(51) Int. Cl.
    *B33Y 10/00*     (2015.01)
    *B33Y 50/00*     (2015.01)
    *B29C 64/393*    (2017.01)
    *B29C 64/386*    (2017.01)
    *B22F 3/10*      (2006.01)
    *B29C 64/153*    (2017.01)
    *B29C 64/40*     (2017.01)
    *G05B 19/40*     (2006.01)
    *G06F 30/00*     (2020.01)

(52) U.S. Cl.
    CPC .............. *B33Y 30/00* (2014.12); *B33Y 50/00*
         (2014.12); *B33Y 50/02* (2014.12)

(58) Field of Classification Search
    CPC ..... B29C 64/386; B29C 64/153; B29C 64/40;
                              G05B 19/4099; G06F 30/00
    USPC .................................................. 700/98, 182
    See application file for complete search history.

(56) References Cited

U.S. PATENT DOCUMENTS

| 2017/0274599 A1 | 9/2017  | Kitamura et al. |
| 2017/0326752 A1 | 11/2017 | Osawa |
| 2017/0333991 A1 | 11/2017 | Kanai |

FOREIGN PATENT DOCUMENTS

| JP | 2016-088066 A  | 5/2016 |
| WO | 2016/042810 A1 | 3/2016 |
| WO | 2016/076211 A1 | 5/2016 |
| WO | 2016/084913 A1 | 6/2016 |

OTHER PUBLICATIONS

Jul. 4, 2017 International Search Report in International Patent Appln. No. PCT/2017/020207.

Apr. 21, 2020 Japanese Official Action in Japanese Patent Appln. No. 2016-115704.

\* cited by examiner

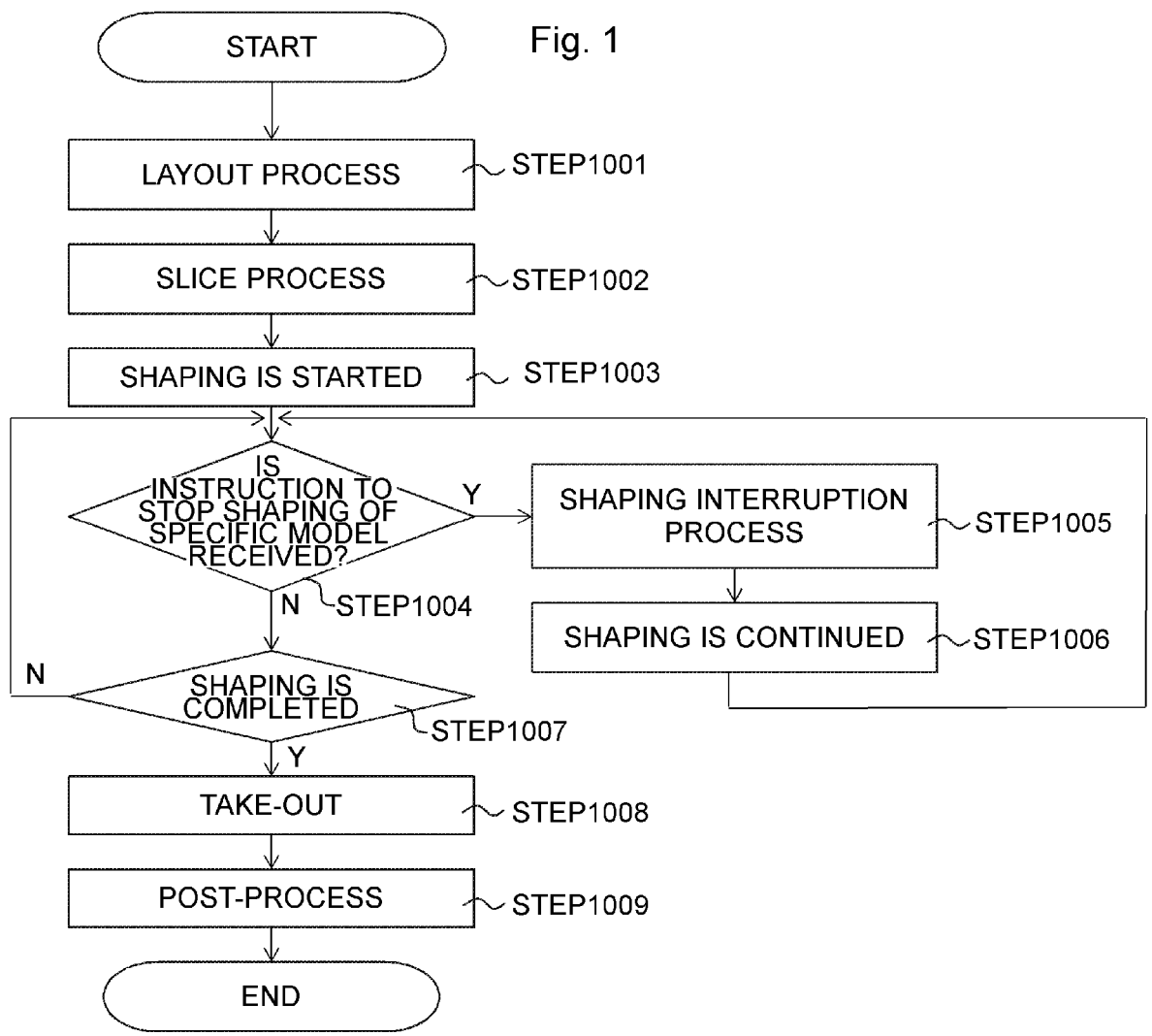

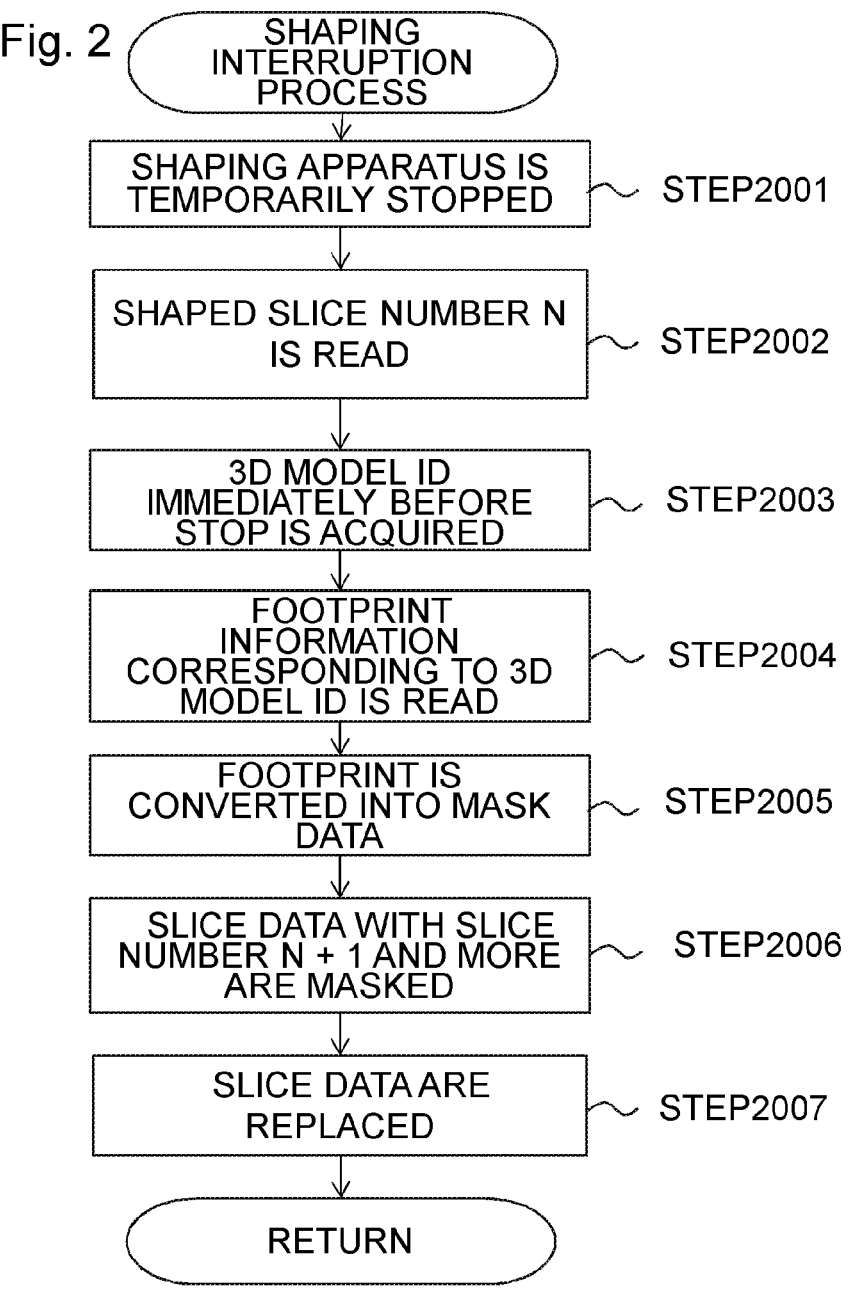

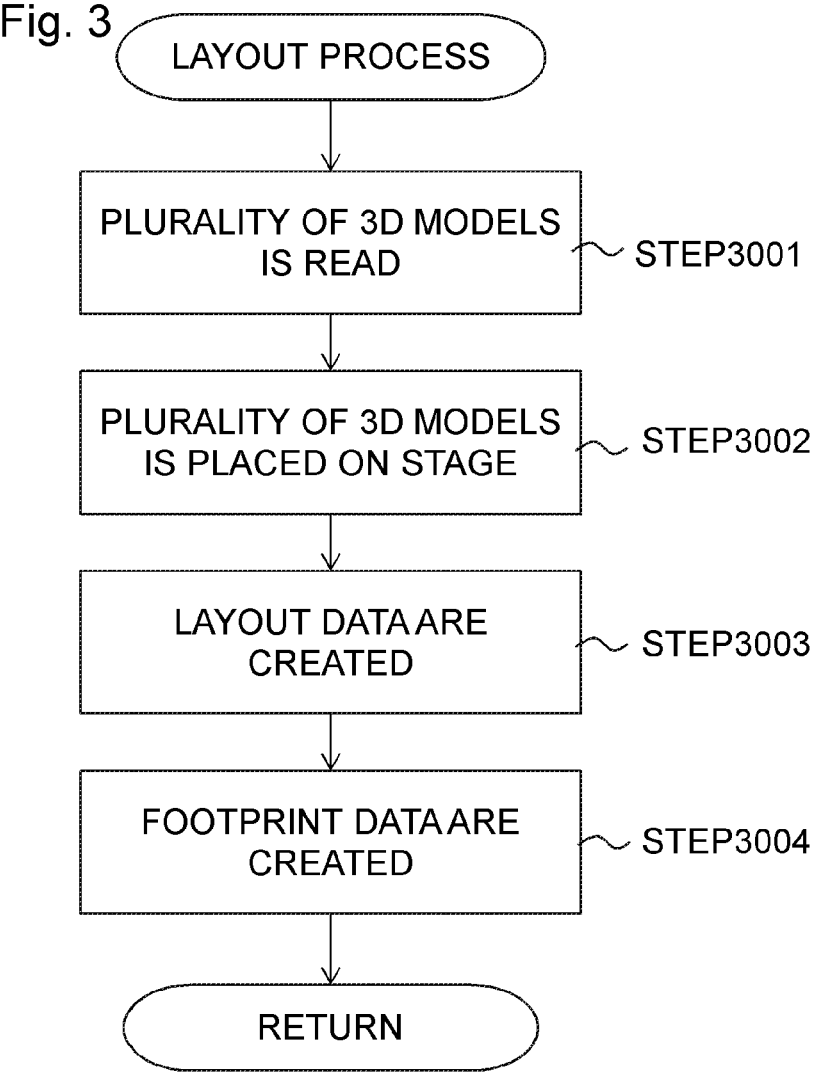

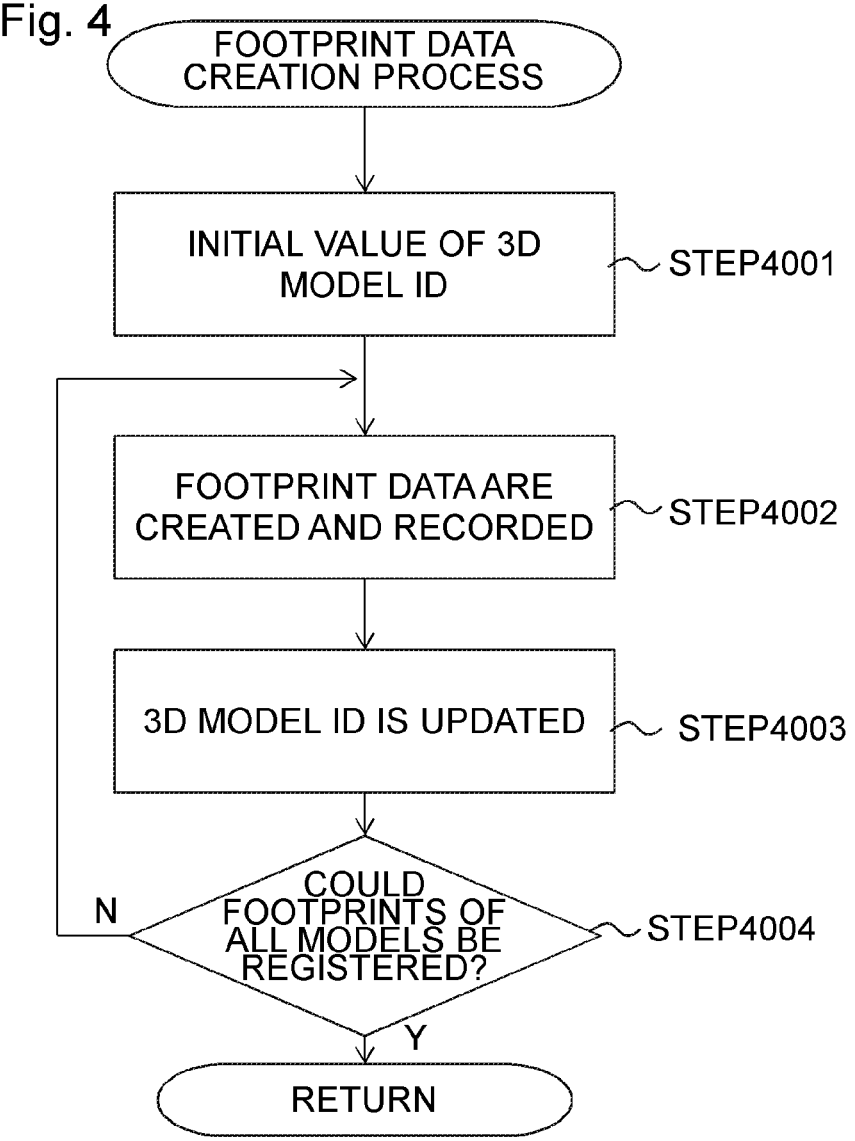

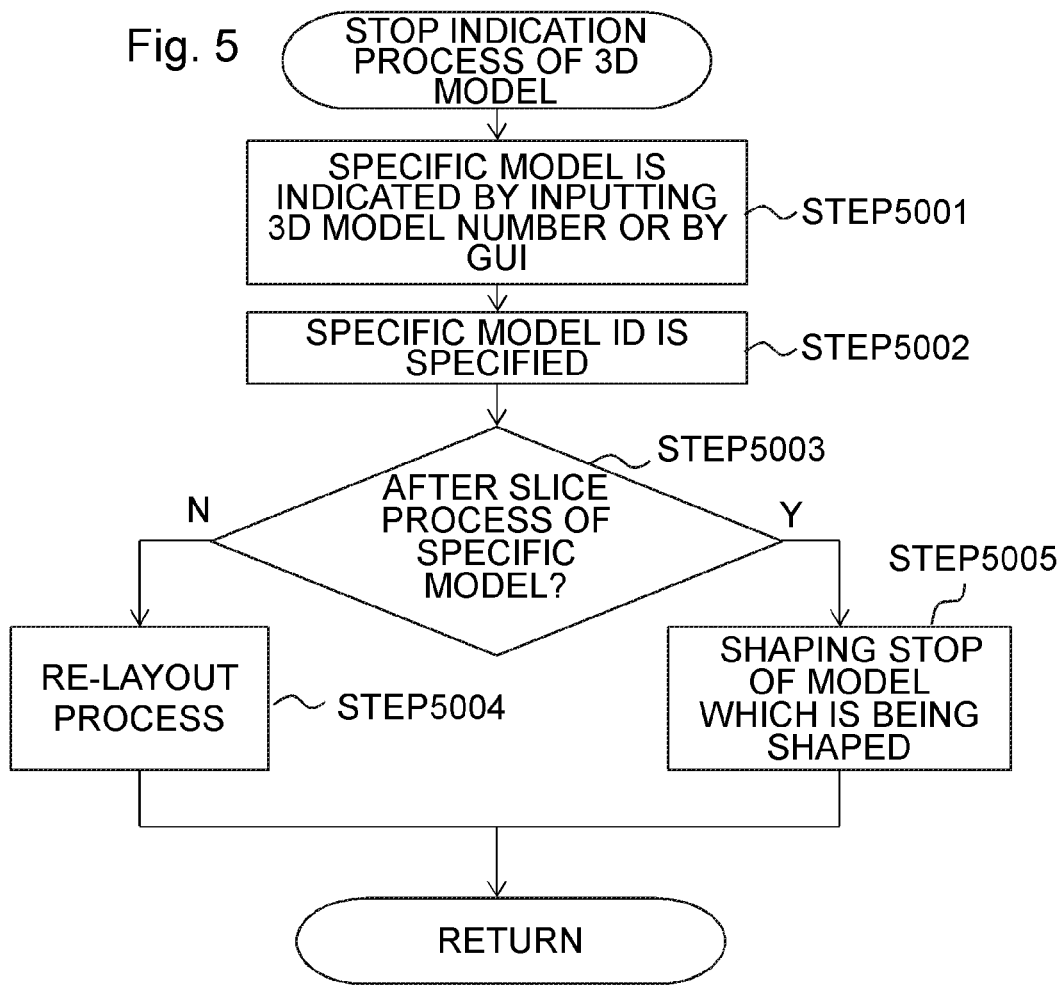

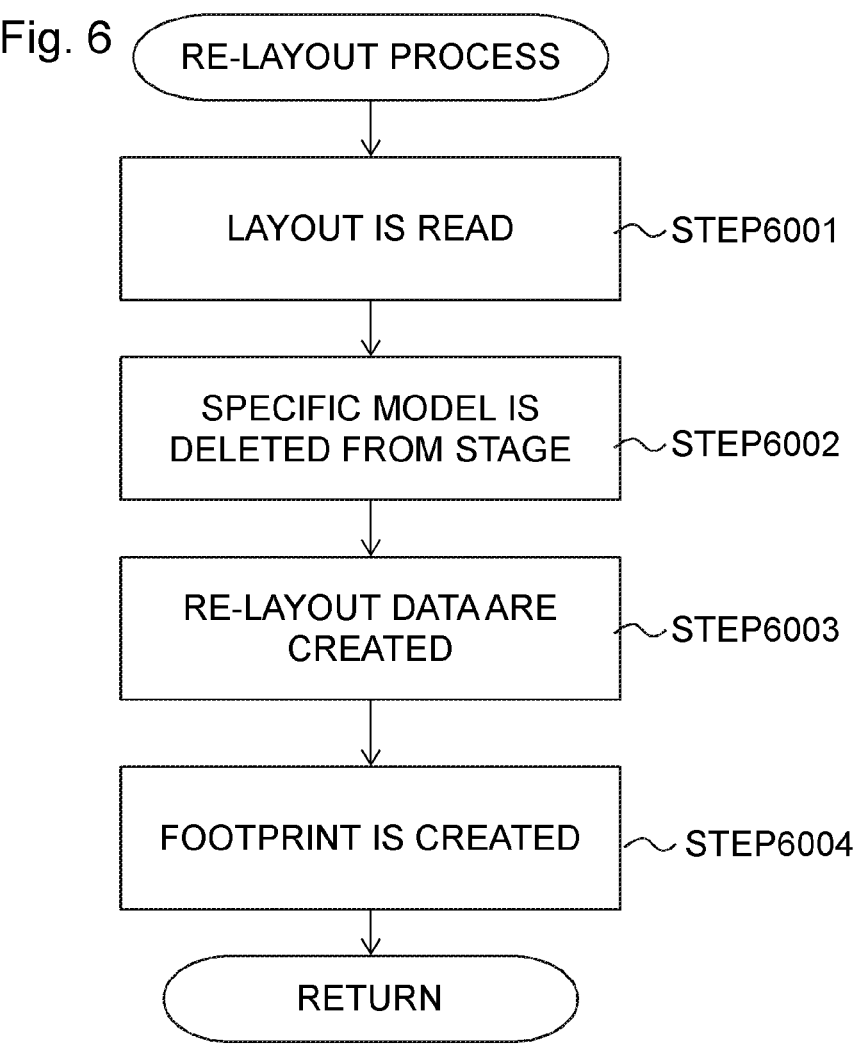

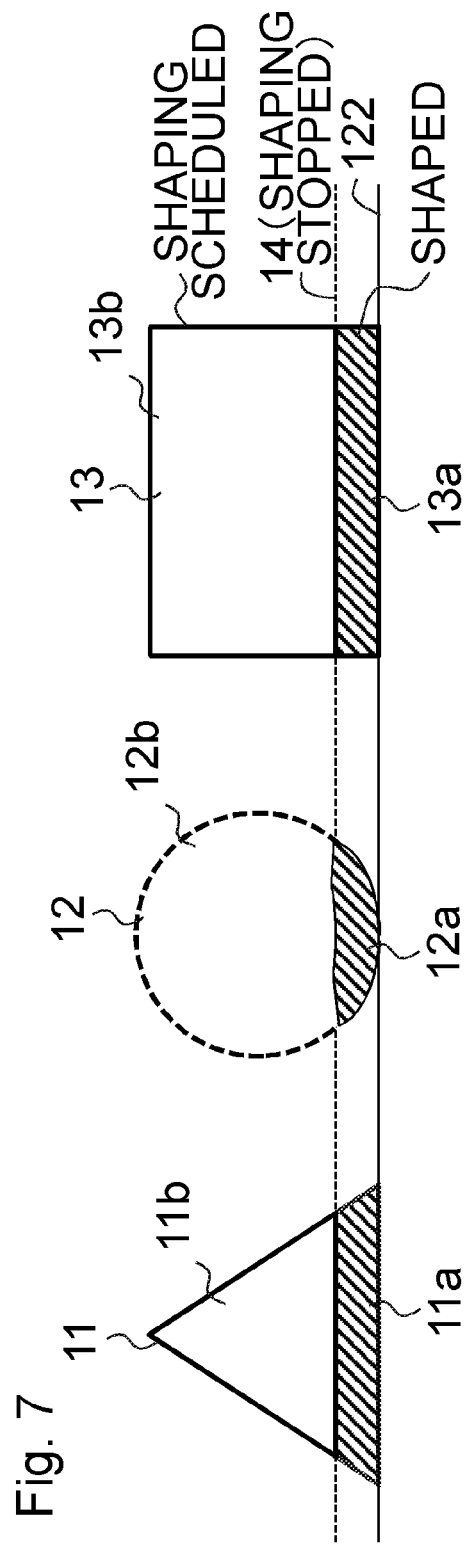

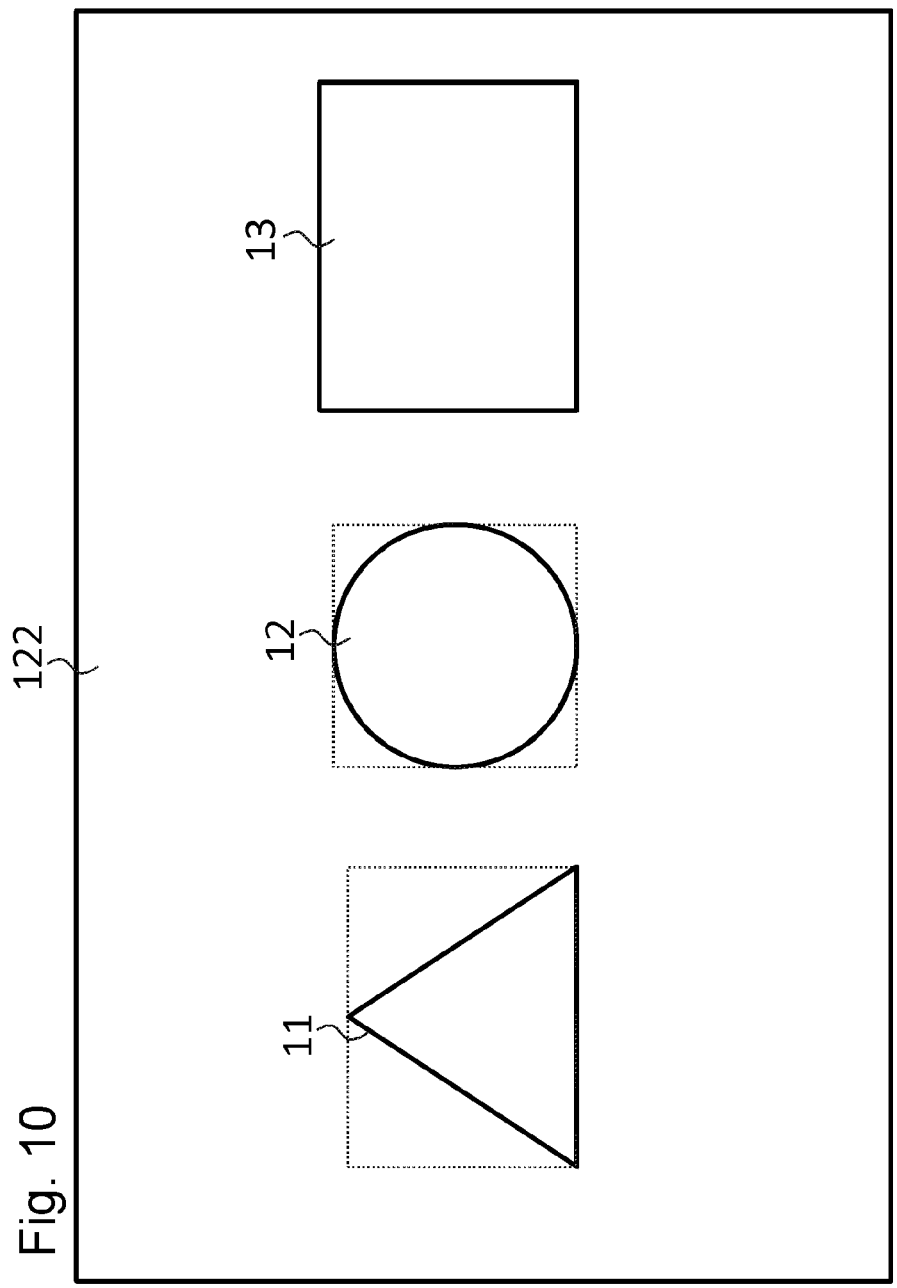

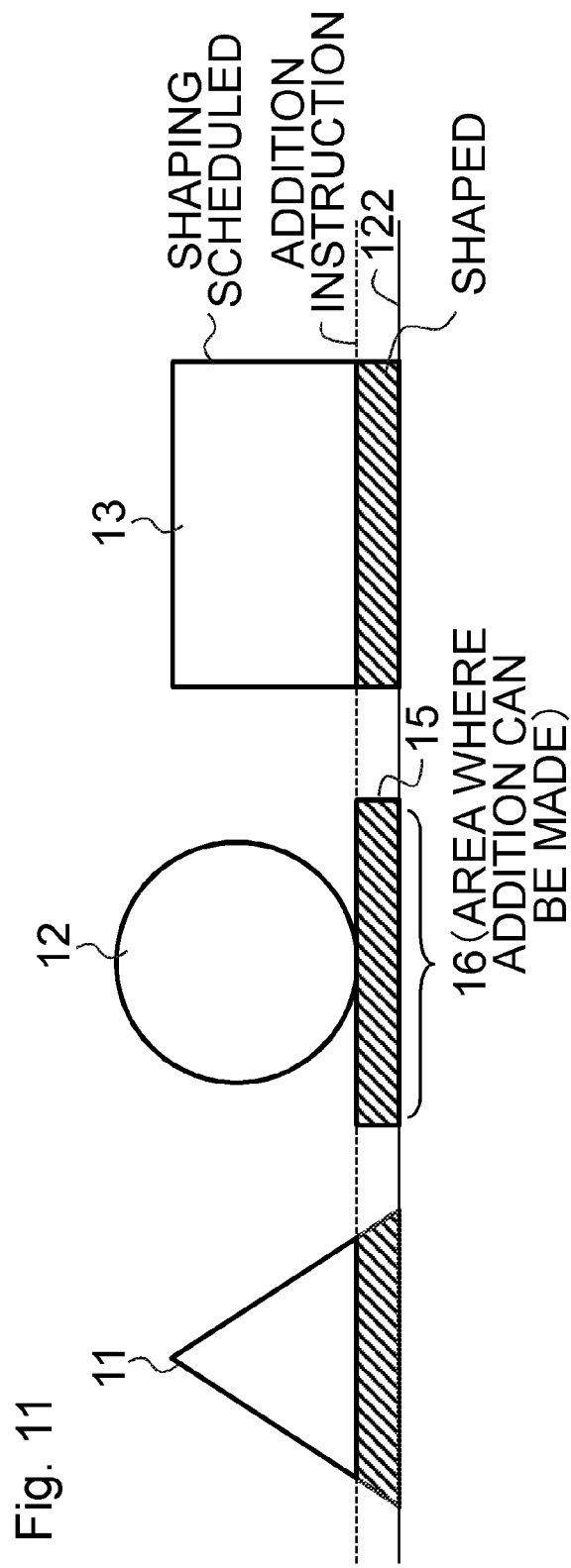

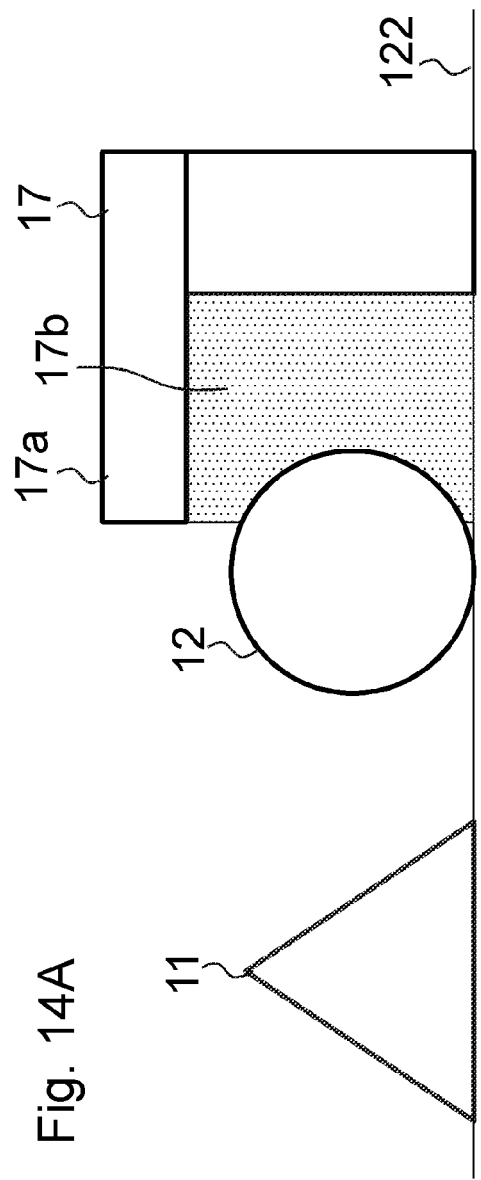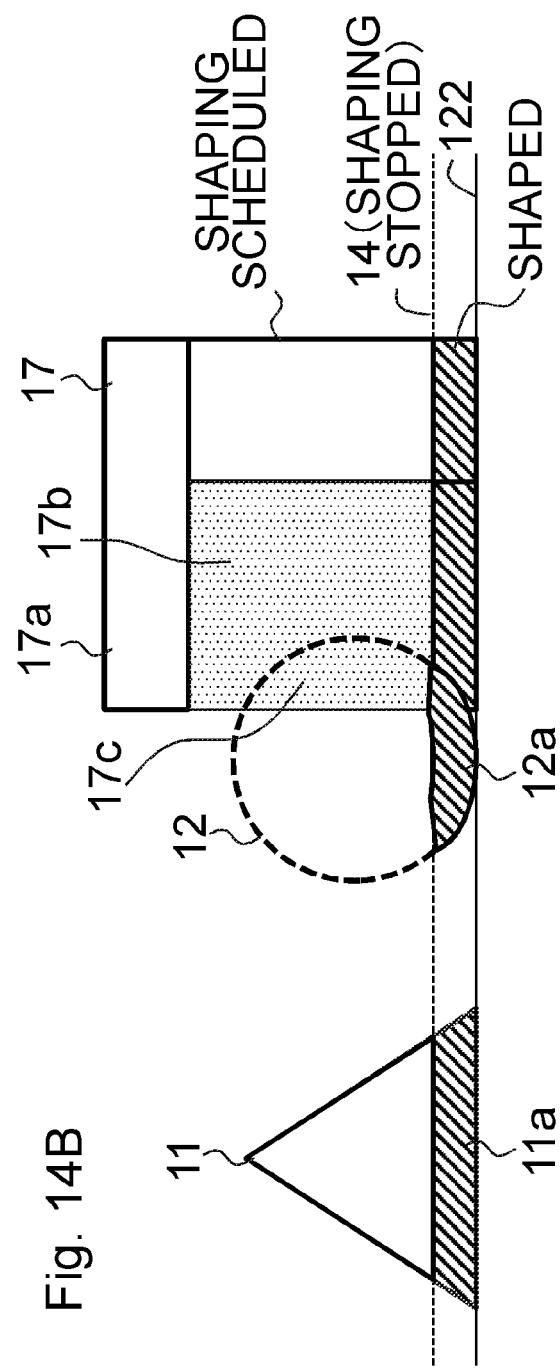

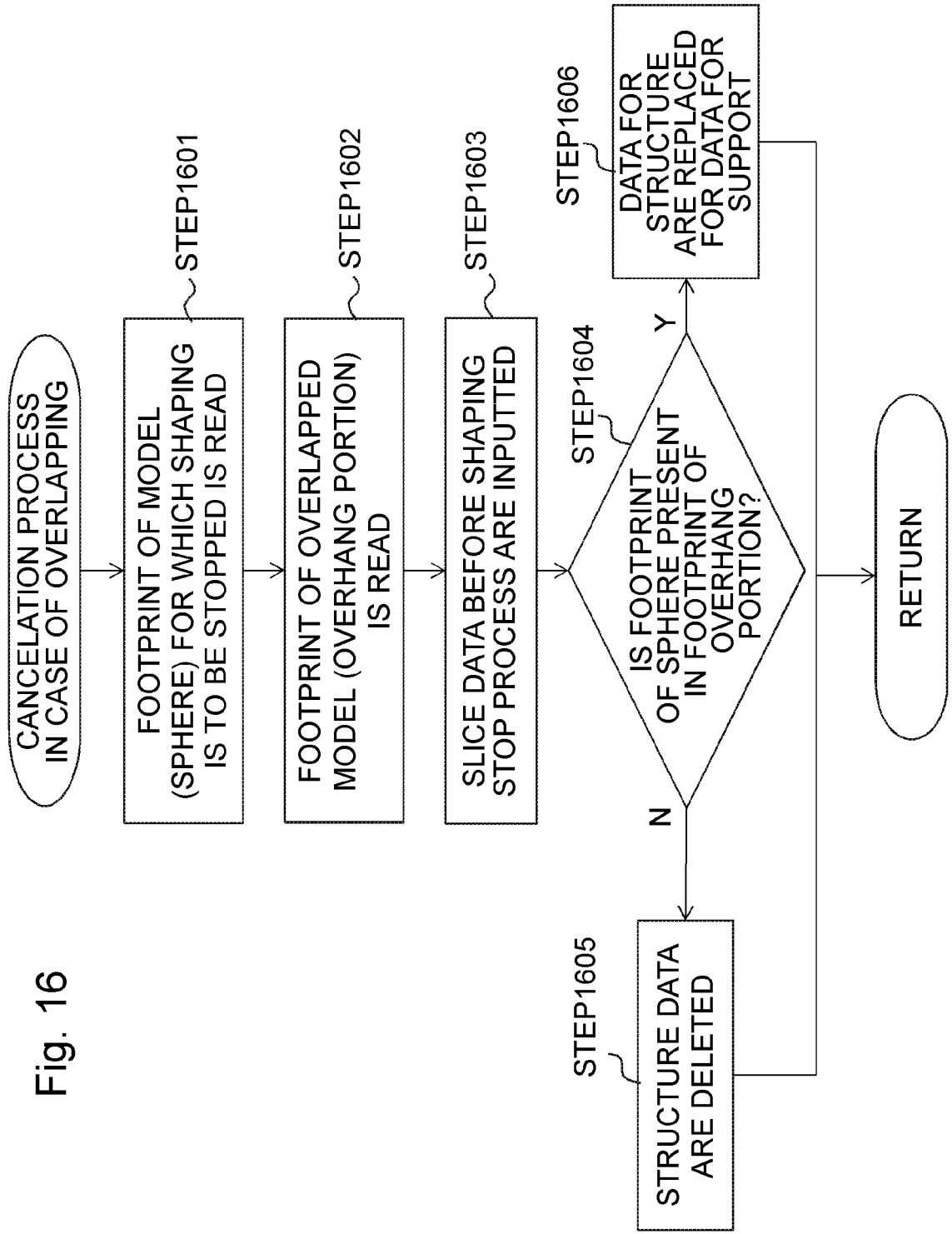

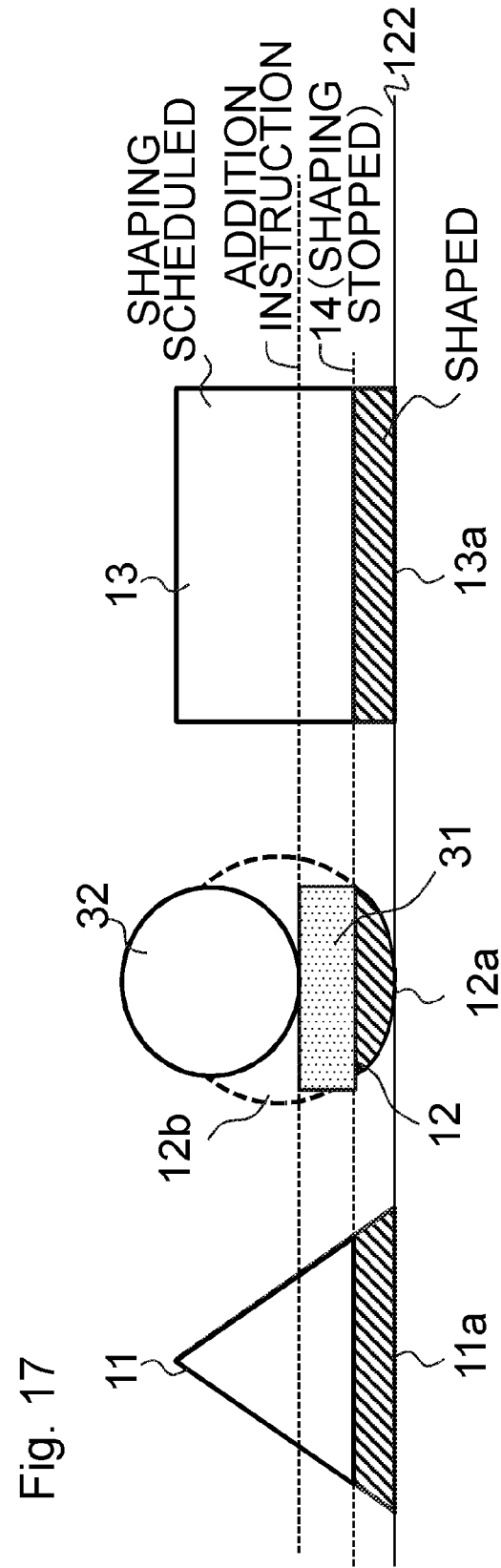

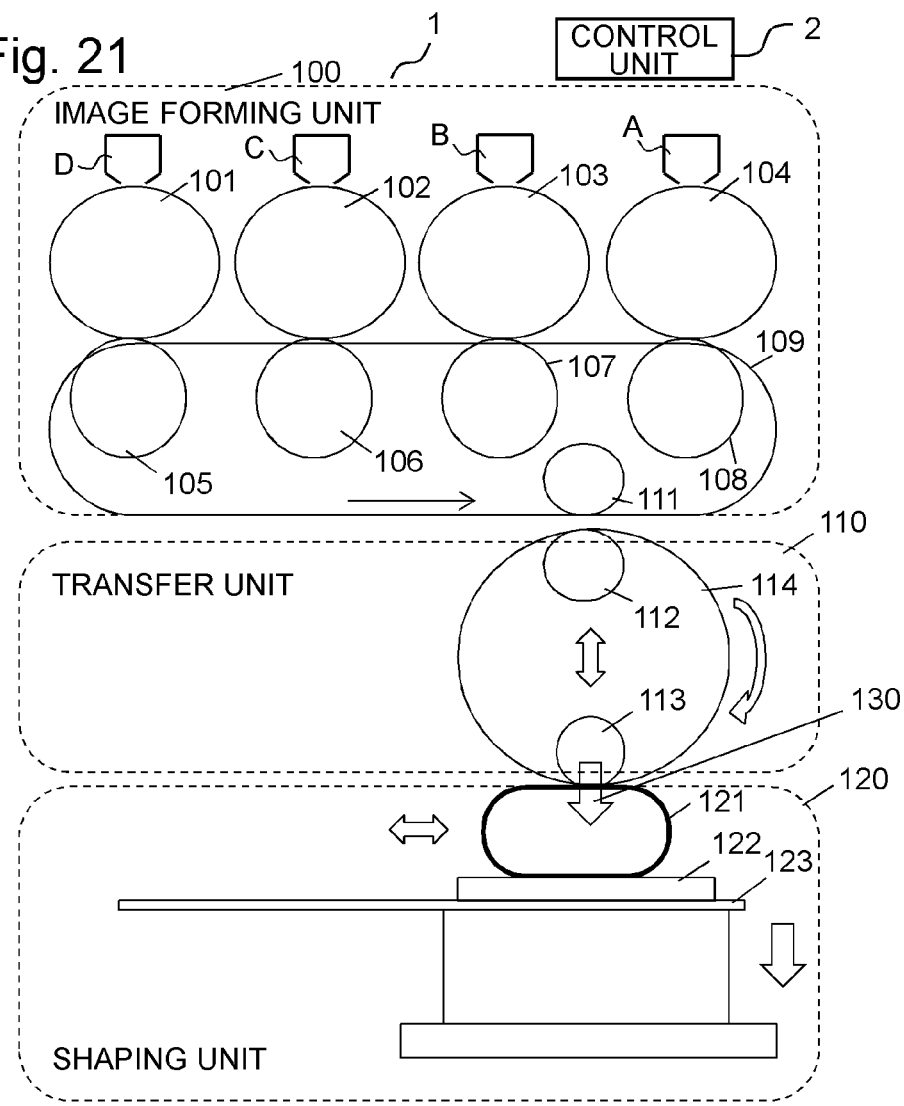

SHAPING METHOD AND SHAPING APPARATUS

CROSS-REFERENCE TO RELATED APPLICATIONS

This application is a Continuation of International Patent Application No. PCT/JP2017/020207, filed May 31, 2017, which claims the benefit of Japanese Patent Application No. 2016-115704, filed Jun. 9, 2016, both of which are hereby incorporated by reference herein in their entirety.

BACKGROUND OF THE INVENTION

Field of the Invention

The present invention relates to a shaping method and a shaping apparatus.

Description of the Related Art

In recent years, a three-dimensional shaping technique called additive manufacturing (AM) has attracted attention. In the AM technique, slice data are generated by slicing a three-dimensional model of a shaping target object into a plurality of layers, a material layer is formed by a shaping material on the basis of the slice data, and a solid object is shaped by sequentially stacking and fixing material layers on a shaping stage.

In a method of expressing a three-dimensional shaping object, a format called STL (Stereo Lithography) is often used. STL data consist of normal coordinate and three-dimensional XYZ coordinate points of triangles constituting the surface of a three-dimensional object. A three-dimensional model representing a solid object is generally configured of a shell (a set of adjacent polygons) which is a group of adjacent triangles.

When generating a plurality of three-dimensional models in such a shaping apparatus, there are cases where a plurality of three-dimensional models is arranged on the stage. Although an arbitrary arrangement method may be used, it is necessary to prevent the shaping objects from overlapping with each other, to perform the arrangement so that the shaping time is shortened, and prevent the shaping objects from mixing when the shaping objects are taken out from the stage after shaping.

PTL 1 discloses a method of arranging a plurality of shaping models, for which a shaping direction has been determined so as to minimize the shaping time, in a close-packed manner without overlapping.

CITATION LIST

Patent Literature

PTL 1: Japanese Patent Application Publication No. 2012-96426 (Japanese Patent No. 5615667)

However, the following concerns are associated with the conventional shaping apparatus. For example, during fabrication of a solid object including a plurality of three-dimensional models, the fabrication of a specific three-dimensional model on the stage may be stopped due to a sudden design change or for various other reasons. In such a case, especially in a method using a support body at an overhang portion, excluding a powder fixing method and a powder sintering method, once the shaping starts, it is only possible to complete the shaping and discard the specific three-dimensional model or to stop the entire shaping.

In the case of discarding a specific three-dimensional model, there is a concern that the shaping material is wasted. Further, when the entire shaping is stopped, there is a concern that it is necessary to restart the layout and generation of slice data on the three-dimensional models from which the specific three-dimensional model has been removed and then return to the beginning to perform the shaping, and that the shaping time is prolonged.

The present invention has been made in view of the above circumstances, and an object thereof is to provide a technique that makes it possible to change a three-dimensional model during fabrication of a solid object.

SUMMARY OF THE INVENTION

A first aspect of the present invention provides a shaping method for performing shaping by sequentially stacking a shaping material on a stage on the basis of slice data, the shaping method comprising: a step of obtaining slice data by slicing data on a three-dimensional model of a shaping target into a plurality of layers in a predetermined direction; and a step of sequentially stacking the shaping material on the basis of the obtained slice data for the plurality of layers, wherein in a case where a change instruction to change the data on the three-dimensional model of the shaping target is received during shaping, a processing process corresponding to the change instruction is performed on remaining slice data to be used for the shaping after the change instruction among the slice data for the plurality of layers, and the shaping is continued using the remaining slice data after the processing process.

A second aspect of the present invention provides a shaping apparatus that performs shaping by sequentially stacking a shaping material on a stage on the basis of slice data, the shaping method apparatus comprising: a generation unit configured to generate slice data by slicing data on a three-dimensional model of a shaping target into a plurality of layers in a predetermined direction; a storage unit configured to store the generated slice data for the plurality of layers; and a shaping unit configured to perform stacking of the shaping material on the basis of the slice data for the plurality of layers stored in the storage unit, and also comprising a processing unit configured to receive a change instruction to change the data on the three-dimensional model of the shaping target during shaping, and performing a processing process corresponding to the change instruction, on remaining slice data to be used for the shaping after the change instruction among the slice data for the plurality of layers, which have been stored in the storage unit, wherein the shaping unit continues the shaping by using the remaining slice data after the processing process performed by the processing unit.

Further features of the present invention will become apparent from the following description of exemplary embodiments with reference to the attached drawings.

BRIEF DESCRIPTION OF THE DRAWINGS

FIG. 1 is a flowchart for explaining an overall process according to Embodiment 1;

FIG. 2 is a flowchart of a shaping interruption process in step 1005 in FIG. 1;

FIG. 3 is a flowchart of a layout process in step 1001 in FIG. 1;

FIG. 4 is a flowchart of a footprint creation process in step 3004 in FIG. 3;

FIG. 5 is a flowchart of an instruction process of a 3D model for which shaping is to be stopped;

FIG. 6 is a flowchart of a re-layout process in step 5004 in FIG. 5;

FIG. 7 is a diagram schematically showing a shaping state of a shaping object at the time of shaping stop;

FIG. 10 is a diagram showing a state in which three 3D models are laid out on a stage;

FIG. 11 is a diagram for explaining a process of adding a new 3D model in the middle of shaping according to Embodiment 2;

FIGS. 14A and 14B are diagrams for explaining a mode in which there is an overlapping region in a plurality of footprints in Embodiment 3;

FIG. 16 is a flowchart of a process executed when the shaping is stopped in Embodiment 3;

FIG. 17 is a diagram for explaining a mode of performing additional shaping in an area where the shaping has been stopped in Embodiment 4;

FIG. 21 is a diagram for explaining a shaping system.

DESCRIPTION OF THE EMBODIMENTS

Figure 8A:
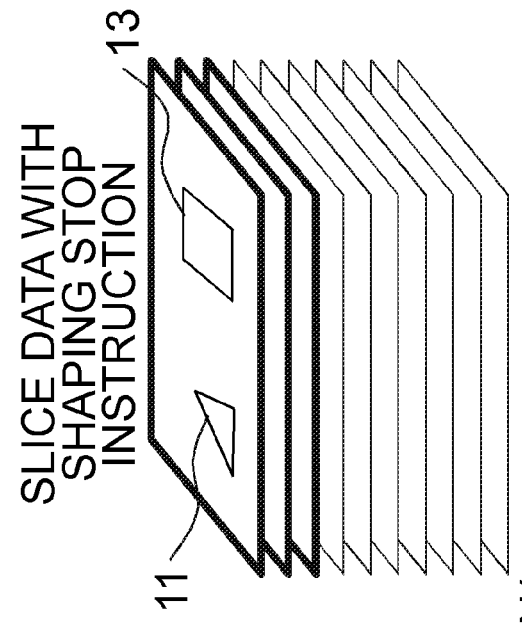
FIGS. 8A and 8B are diagrams schematically showing a state in which a plurality of material layers is stacked based on slice data.

Hereinafter, modes for carrying out the present invention will be exemplarily described with reference to the drawings. However, the procedures, control parameters, and the like of various types of control, such as the dimensions, materials, shapes, relative arrangement and the like of parts described in the following embodiments are not intended to limit the scope of the present invention, unless specifically stated otherwise.

The present invention relates to a shaping system using a stacking shaping technique (AM technique), that is, a technique for fabricating a three-dimensional object (solid object) by arranging a shaping material two-dimensionally and stacking by layers.

An example of the shaping system 1 according to the present invention, which will be described hereinbelow with reference to FIG. 21, generally includes a control unit 2 having a function of performing data processing for shaping and the like, an image forming unit (image forming unit 100), and a shaping unit (shaping unit 120). The control unit 2 performs a process of generating slice data for a plurality of layers on the basis of three-dimensional model data on a three-dimensional model (shaping object) which is the object of shaping, a process of storing the generated slice data for a plurality of layers in a storage device, and control of each part of the shaping system 1. The control unit 2 is, for example, a computer including a CPU (processor), a memory, a storage device, an input device, a display device, and the like. The functions of the control unit 2 are realized by the CPU executing a program stored in the storage device or the like.

Further, in the shaping system 1, when a change instruction to change a three-dimensional model included in the solid object is received during fabrication of the solid object, the following specific processing process is performed. That is, a processing process corresponding to the change instruction is performed on remaining slice data, which are to be used for fabricating the solid object after the change instruction, among the slice data for the plurality of layers which have been stored in the storage device. Then, the fabrication of the solid object is continued using the remaining slice data after the processing process. The change instruction can be exemplified by an instruction to stop the fabrication of a specific three-dimensional model among a plurality of three-dimensional models, an instruction to add a new three-dimensional model to the solid object, and the like. The processing process will be described in detail by using embodiments.

As the shaping material, various materials can be selected according to the use, function, purpose, and the like of the solid object to be fabricated. In the present specification, a material constituting a three-dimensional object which is to be shaped is called a "build material", and a portion formed of a build material is called a structure. The material constituting a support body (for example, a column that supports an overhang portion from below) for supporting the structure under fabrication is called "support material". In addition, when it is not necessary to distinguish between the two materials, the term "build material" is simply used. As the build material, for example, thermoplastic resins such as PE (polyethylene), PP (polypropylene), ABS, PS (polystyrene) and the like can be used. As the support material, a build material may be used, but in order to simplify the removal from the structure, a material having thermoplasticity and water solubility can be preferably used. Examples of support materials include carbohydrates, polylactic acid (PLA), PVA (polyvinyl alcohol), PEG (polyethylene glycol) and the like.

Further, in the present specification, digital data obtained by slicing three-dimensional model data on a solid model to be shaped, into a plurality of layers in a stacking direction is referred to as "slice data". A layer formed of a shaping material on the basis of the slice data is referred to as a "material layer" or "material image". Further, a solid model to be fabricated using a shaping apparatus (that is, a three-dimensional object represented by image data (three-dimensional model data) supplied to the shaping apparatus) is referred to as a "shaping target object", and a three-dimensional object (solid object) fabricated by (outputted from) the shaping apparatus may be referred to as "shaping object" in some cases. In the case where the shaping object includes a support body, a portion excluding the support body becomes the "structure" constituting the shaping target object.

Embodiment 1

FIG. 1 is a flowchart for explaining the overall process performed by a control unit 2 of the present embodiment. In the present embodiment, a description will be given of a case where an instruction to stop shaping of a specific model is received while shaping a plurality of three-dimensional models at once.

In step 1001, a layout process is performed to determine the arrangement when a plurality of three-dimensional models (hereinafter, 3D models) is formed on a stage 122.

Figure 9:
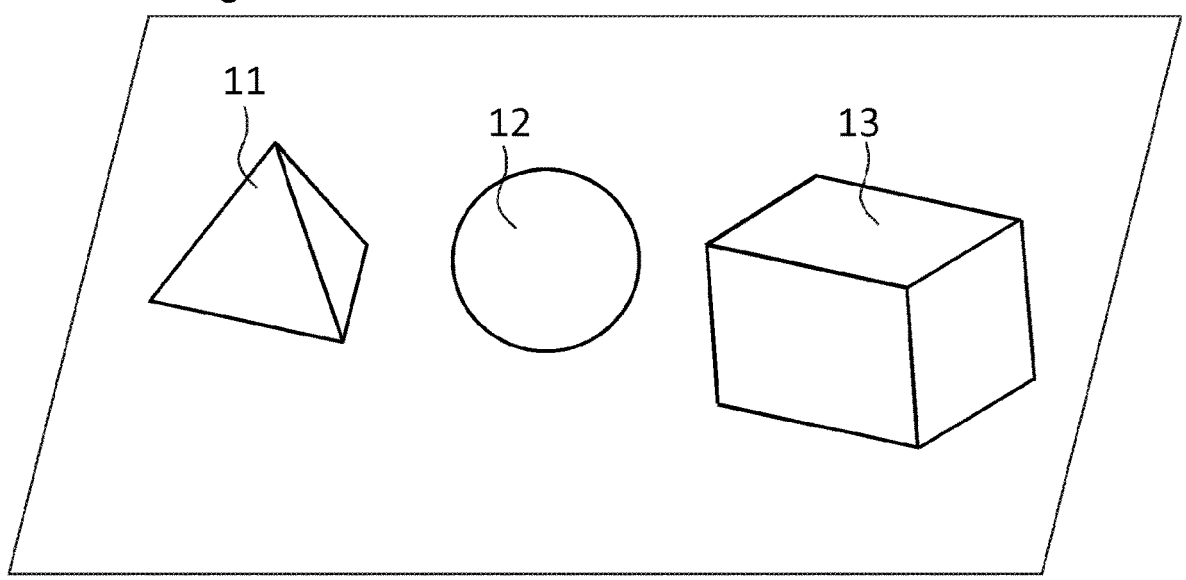
FIG. 9 is a diagram in which a footprint of a 3D model is arranged at a corresponding position of a material layer.

Here, three 3D models will be described with reference to FIG. 9. FIG. 9 is a diagram schematically showing a state in which three 3D models, namely, a triangular pyramid 11, a sphere 12, and a rectangular parallelepiped 13, are laid out on the stage 122. In this way, in a shaping system 1, a plurality of 3D models that can be arranged on the stage 122 can be shaped at once.

Returning to the explanation of step 1001, as will be described later with reference to FIG. 3, the shaping positions of a plurality of 3D models are determined, and the shape (the projection shape when it is assumed that projection is made on the stage) of a footprint, which becomes a planar figure when viewed from above, is recorded.

In step 1002, the control unit 2 performs a slice process for creating layers to be stacked. The control unit 2 calculates a cross section of the 3D model described in the STL, converts the calculation results into slice data indicating the build material and the support material, and stores the slice data. The slice data are created by slicing a plurality of 3D models together while maintaining the positional relationship of the plurality of 3D models laid out in step 1001.

In step 1003, the control unit 2 issues an instruction to start shaping. When instruction to start shaping is issued, the shaping material is sequentially stacked on the stage on the basis of the slice data. Step 1004 is a determination step in which the control unit 2 determines whether or not an instruction to stop shaping of a specific 3D model (hereinafter referred to as a specific model) among a plurality of 3D models arranged on the stage 122 has been received. When an instruction to stop shaping of a specific model is inputted during shaping, a shaping interruption process is performed in step 1005. This feature will be described hereinbelow with reference to FIG. 2. Upon completion of the process related to stopping the shaping of the specific model, the control unit 2 continues shaping in step 1006. Upon completion of shaping (Yes in step 1007), a take-out process of the shaping object is performed in step 1008. In step 1009, a post-process such as removal of the support body and surface machining is performed on the shaped shaping object. The processes in steps 1008 and 1009 may be performed by the user or may be performed automatically by the control unit 2.

FIG. 2 is a flowchart of a shaping interruption process in step 1005 in FIG. 1. In the shaping interruption process, a process (shaping stop process) for deleting cross-sectional data on a specific model is performed as a processing process of slice data.

Step 2001 is a temporary stop process of shaping. In consideration of restarting the shaping, the control unit 2 temporarily stops the shaping. Regarding this method, it is advisable to use a method which is optimum for the shaping apparatus and shaping method.

In step 2002, the control unit 2 reads and stores the slice number N of the stacked layer immediately before the temporary stop of shaping.

In step 2003, the control unit 2 acquires a 3D model ID of the specific model for which shaping is to be stopped. A method used by the control unit 2 to acquire the 3D model ID can be exemplified by a method in which the user inputs the 3D model number as shown in FIG. 5. Another example is a method in which the user indicates a specific model with a computer mouse or the like through a graphical user interface (GUI).

In step 2004, the control unit 2 reads footprint information corresponding to the 3D model ID.

In step 2005, the control unit 2 converts the footprint into mask data.

In step 2006, the control unit 2 performs masking on the slice data with a slice number of N+1 and more and clears the masked portion of the slice data. For masking, a method used in the field of 2D printers can be used. Here, the slice data with a slice number of N+1 and more are slice data to be used for fabricating a shaping object with a slice number of N+1 and more (at and after the change instruction) among the slice data on the plurality of layers stored in the storage device of the control unit 2. These data are hereinafter referred to as remaining slice data.

Step 2007 is a step of replacing the slice data in which the control unit 2 replaces (changes) the slice data for forming a material layer before stacking with the masked slice data.

By using such masked slice data instead of remaining slice data, the shaping of the specific model is stopped. In the present embodiment, the shaping stop process of the specific model is performed by masking, but the present invention is not limited to such a process, and a process of deleting cross-sectional data on a specific model from the remaining slice data may be also performed.

FIG. 3 is a flowchart of the layout process in step 1001 in FIG. 1.

In step 3001, the control unit 2 reads a plurality of 3D model data.

In step 3002, a plurality of 3D models is arranged on the stage 122. In this step, for example, as shown in FIG. 9, three 3D models, namely, a triangular pyramid 11, a sphere 12, and a rectangular parallelepiped 13, are arranged side by side on the stage 122. This arrangement may be automatically performed by the control unit 2 according to a predetermined rule, or may be performed manually by the user. The predetermined rule may be aimed at, for example, minimizing the height of the solid object to be shaped, placing a plurality of shaping models in the minimum volume, minimizing the necessary support material, and the like.

In step 3003, the control unit 2 creates layout data. In this step, layout data are assumed to include the arrangement coordinates for arranging each 3D model and the coordinates of the 3D models.

In step 3004, the control unit 2 creates footprint data and stores the 2D image of the footprint of each 3D model and the coordinates on the stage 122. This process will be described later with reference to FIG. 4.

Here, the footprints of the three 3D models will be described with reference to FIG. 10. FIG. 10 is a diagram schematically showing a state in which footprints of three 3D models (triangular pyramid 11, sphere 12, and rectangular parallelepiped 13) are respectively arranged at corresponding positions of the material layer. A triangle, a circle, and a square are each a footprint (corresponding to a vertical projection of the 3D model on the stacking surface). However, the mask data may be a bottom shape of a columnar body circumscribing the 3D model, rather than the footprint.

FIG. 4 is a flowchart of the footprint data creation process of step 3004 in FIG. 3.

In step 4001, the control unit 2 sets the initial value of the 3D model ID. In step 4002, the control unit 2 creates a footprint shape that becomes a planar figure when the 3D model with a set ID is viewed from above, and stores the 3D model ID and footprint information in association with each other.

In step 4003, the control unit 2 updates the 3D model ID. In step 4004, the control unit 2 determines whether or not the footprint information of all models to be shaped at the same time could be registered, and when registration has not been completed, a negative determination is made, and the processing returns to step 4002.

FIG. 5 is a flowchart of an indication process of a 3D model for which shaping is to be stopped.

In step 5001, the user inputs a 3D model ID or indicates a specific model through a GUI.

In step 5002, the control unit 2 specifies the specific model inputted or indicated by the user in step 5001.

In step 5003, the control unit 2 determines the slice process state of the specific model and determines whether the slice process of the specific model has been completed. When the slice process has not yet been executed, that is, when the determination in step 5003 is negative, the processing advances to step 5004 to perform the re-layout process. This process will be described later with reference to FIG. 6. When the slice process has been executed (including the case where the slice process is being executed), that is, when the determination in step 5003 is positive, the processing advances to step 5005 where a shaping interruption process of the specific model being shaped is performed.

The reason why the subsequent process is changed depending on the slice process state of the specific model is as follows. Thus, this is because the slice process is not necessarily completed before the shaping as in the spool method of the slice data described above, and may be executed just before the stacking as in the on-demand print method. A method of changing the subsequent process before or after the slice process, as indicated above, is an example, and the determination as to whether to change the process after the start of shaping or before the start of shaping can be used there instead.

FIG. 6 is a flowchart of the re-layout process of step 5004 in FIG. 5.

In step 6001, the control unit 2 reads the layout data already laid out, and the layout before the stop instruction is reproduced.

In step 6002, the control unit 2 performs an operation of deleting a specific model from the stage 122. Through this operation, a 3D model for which shaping is to be stopped is designated and deleted from the layout on the stage 122.

In step 6003, the control unit 2 creates the re-layout data, and stores the 3D model to be shaped and the position coordinates on the stage 122.

In step 6004, the control unit 2 creates a footprint, and a 2D image of the footprint of the 3D model re-laid out on the stage 122 and the position coordinates thereof are stored.

FIG. 7 is a diagram schematically showing the shaping state of shaping objects at the shaping stop time. FIG. 7 shows that the lower layer portion has been formed in three 3D models (triangular pyramid 11, sphere 12, and rectangular parallelepiped 13).

In FIG. 7, the lowermost portion represents the shaping surface on the stage 122, and the hatched portions 11a, 12a, and 13a thereabove show the already shaped parts of the respective shaping objects which are being shaped. A line 14 on the upper side of the hatched portions represents a point in time when an instruction to stop shaping of a specific model is given.

The present embodiment illustrates the case in which an instruction to stop the shaping of the sphere 12 has been issued, and a broken line portion 12b shown in FIG. 7 shows the portion of the sphere (the portion of the sphere where shaping has been stopped) which was planned to be shaped.

Regarding the triangular pyramid 11 and the rectangular parallelepiped 13, when the shaping is restarted, the shaping with respect to the shaping objects 11a, 13a which are being shaped is continued, so that when the shaping of the shaping objects is completed, only the triangular pyramid 11 and the rectangular parallelepiped 13 among the three 3D models will be taken out as shaping objects shaped as originally scheduled.

As described above, in the present embodiment, the shaping of the sphere 12 can be stopped while shaping the three 3D models, and the shaping can be completed for the triangular pyramid 11 and the rectangular parallelepiped 13.

As a result, since it is not necessary to complete the shaping of the sphere 12, it is possible to suppress wasteful consumption of the shaping material and to efficiently use the shaping material. Further, it is not necessary to stop the entire shaping process and remove the data on the sphere 12, and then to retry shaping of the triangular pyramid 11 and the rectangular parallelepiped 13 from the beginning, as in the conventional method, and therefore the shaping time can be shortened.

In addition, since the portion 12a at the lower side of the sphere 12, which is not required to be shaped, has been shaped but is not a finished product, it is possible to reduce the amount of material to be discarded.

Figure 8B:
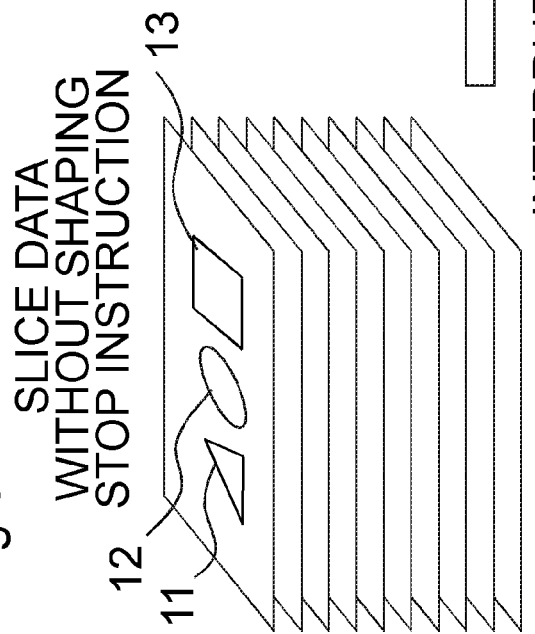

FIGS. 8A and 8B are diagrams schematically showing a state in which a plurality of images represented by slice data are stacked. FIG. 8A shows a case where there is no instruction to stop shaping of a specific model, FIG. 8B shows a case where there is an instruction to stop shaping of a specific model (here, the sphere 12), and the shaping is restarted after the shaping interruption process. One layer to be formed based on the slice data may have any size as long as the layer fits within the area where the shaping can be performed on the surface (stacking surface) of the stage 122. For example, one layer may have the size of the bottom area of the columnar body including a plurality of 3D models.

The lower slice data (slice data shown by thin lines) shown in FIG. 8B are the same slice data as in FIG. 8A. The upper slice data (slice data shown by bold lines) shown in FIG. 8B are slice data in which the data portion corresponding to the portion of the sphere 12 is masked. The data portion forming the sphere 12 is arranged in the center region of the slice data in the lower slice data but is not present in the upper slice data, which indicates that the shaping of the sphere 12 has been stopped halfway.

As described above, in the present embodiment, in the case where the shaping of a specific model included in a shaping object is stopped during shaping of the shaping object, the processing process for masking the data on the cross section of the specific model from the remaining slice data is performed. This makes it possible to stop shaping of the specific model without waiting for completion of shaping of the specific model during shaping of the shaping object. Further, it is not necessary to stop the entire shaping and discard all portions that have been shaped, or to restart shaping from the beginning with the slice data from which the specific model has been deleted. In addition, it is not necessary to remove a specific model or dispose of it after the shaping of the shaping object including the specific model has been completed.

Therefore, unnecessary consumption of shaping material can be suppressed, the shaping time can be shortened, and a process after shaping can be simplified.

Here, it is also conceivable to interrupt the shaping, regenerate the layout and slice data on the 3D model, from which the specific model has been removed, on the basis of the 3D model data and replace the data with the remaining slice data. However, in this case, since the layout and the slice data on the 3D model, from which the specific model has been removed, are regenerated based on the 3D model data, there is concern that the time required for regenerating the data will be prolonged. Meanwhile, in the present embodiment, since the processing process is performed on the remaining slice data, it is possible to further shorten the shaping time as compared with the case where the layout and the slice data are regenerated from the beginning on the basis of the 3D model data.

Embodiment 2

Embodiment 2 will be described below. In the present embodiment, a configuration and a process different from those of Embodiment 1 will be described, and the explanation of the same configuration and process as in Embodiment 1 will be omitted.

In the present embodiment, a process of adding a new 3D model in the middle of shaping, rather than stopping the shaping of a specific model, will be described.

In this process, it is possible to newly add data on a 3D model, which was not included in the slice data at the start of shaping, in the middle of shaping.

When a possibility of adding a new 3D model in the middle of shaping is considered, a shaping region to which a new 3D model can be added is preset on the stage 122, and a support body that will be the foundation for the shaping object to be added is shaped until the addition instruction is given. The type of the shaping material of the support body is not particularly limited to the support material and may be a build material, but it is desirable that the support material be arranged in a portion in contact with the shaping object to which the support body is to be added. As a result, it is possible to facilitate a post-process performed to separate the added shaping object from the foundation portion after the shaping is completed.

FIG. 11 is a diagram for explaining a process of adding a new 3D model in the middle of shaping.

FIG. 11 shows a sphere 12 which is a 3D model to be added in the middle of shaping, a support body 15 serving as a foundation for the sphere 12, and an area 16 where the addition can be made on the stacking surface of the stage 122. The slice data generated by the slice process of the present embodiment include cross-sectional data on the support body 15 for forming the support body 15 in the area 16 where the addition can be made. When a 3D model addition instruction is received, the control unit 2 reads and stores the slice number N of the stacked material layer in the same manner as in Embodiment 1. Then, when a 3D model is to be added at and after the slice number (N+1), the process of replacing the remaining slice data including the cross-sectional data on the support body 15 at and after the slice number (N+1) with the slice data at and after the slice number (N+1) which include the cross-sectional data on the sphere 12 which is a 3D model is performed as the processing process of slice data. Sequential stacking is then performed from the portion on the lower side of the sphere 12 upward on the basis of the remaining slice data including the cross-sectional data on the sphere 12 which have been used for replacement.

When the addition process of the 3D model is performed, the shaping under execution is temporarily stopped, replacement of the slice data is performed, and the shaping is thereafter restarted, whereby the solid body including the added 3D (sphere 12) model may be fabricated. Even with the 3D model that was not planned to be shaped at the start of shaping, the addition can be made provided that the first layer material layer has not yet been formed. In this case, the slice data generated by the slice process do not include the cross-sectional data on the support body 15 such as described above. Therefore, the process of generating slice data including cross-sectional data on a 3D model for which an addition instruction has been issued is performed as the addition process. Specifically, slice data are generated by including the 3D model for which an addition instruction has been issued and performing re-layout, and the slice data before the addition instruction are replaced.

Figure 12B:
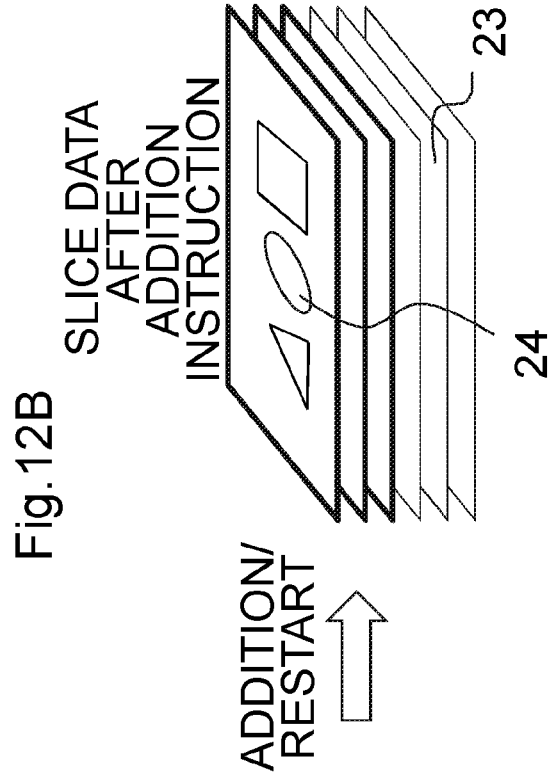
FIGS. 12A and 12B are views schematically showing a material layer of Embodiment 2.
Figure 12A:
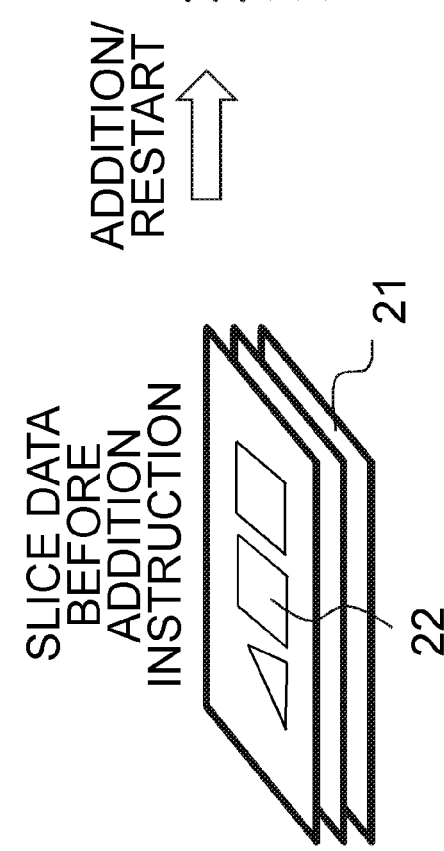

FIG. 12A is a diagram schematically showing the slice data 21 before the addition instruction for the shaping in the case illustrated by FIG. 11. The slice data 21 include a cross-sectional image region 22 for forming a support body which becomes a foundation portion for a shaping object to be added on the area 16 where the addition can be made. Further, FIG. 12B is a diagram schematically showing the slice data 23 after the addition instruction. In FIG. 12B, the cross-sectional image region 22 shown in FIG. 12A is replaced with the slice data 23 including a cross-sectional image region 24 for forming the sphere 12.

Figure 13:
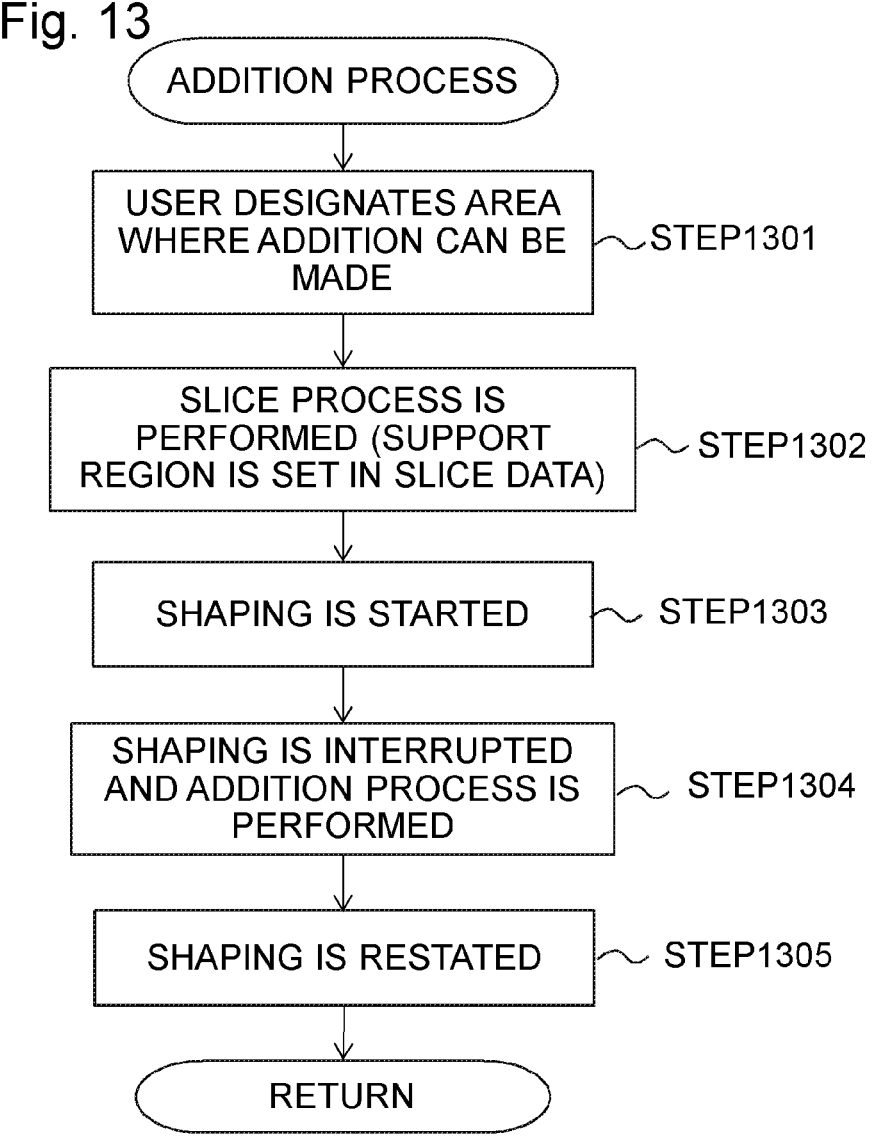
FIG. 13 is a flowchart of a process of adding a 3D model.

FIG. 13 is a flowchart of a process of adding a 3D model.

In step 1301, before the shaping, the user designates an area where the addition can be made.

In step 1302, the control unit 2 performs a slice process. At this time, the slice data 21 including the cross-sectional image region 22 for forming the support body which becomes the foundation portion such as shown in FIG. 12A are generated.

In step 1303, the control unit 2 starts the shaping.

In step 1304, the control unit 2 interrupts the shaping and performs the addition process of the sphere 12 described above. More specifically, upon reception of an instruction to add a shaping object, the slice number N of the stacked material layer is read and stored. Then, re-layout for arranging the 3D model 12 in the area where the addition can be made is performed while maintaining the arrangement of the 3D models 11, 13, and slice data to be used at and after the slice number (N+1) are generated. As a result, in step 1302, the slice data are changed to slice data 23 in which the cross-sectional image region 22 in FIG. 12A is replaced by the cross-sectional image region 24 for forming the sphere 12 in FIG. 12B, while maintaining the continuity of the cross-sectional images of the 3D models 11, 13.

In step 1305, the control unit 2 restarts the shaping.

As described above, according to the present embodiment, it is possible to add a new 3D model to a shaping object, which is being shaped, even during shaping. As a result, it is not necessary to wait for completion of the shaping object, which is being shaped, in order to form the sphere 12 and the shaping time can be shortened.

Embodiment 3

Embodiment 3 will be described below. In the present embodiment, a configuration and a process different from those of Embodiments 1 and 2 will be described, and the explanation of the same configuration and process as in Embodiments 1 and 2 will be omitted.

Described in the present embodiment is a case where there is an overlap of planar figures when a plurality of 3D models is viewed from above (there is a region where a plurality of footprints overlaps with each other), and a specific model also serves as a part of a support body that supports another 3D model. In such a case, when the shaping of the specific model is stopped, a part of the support body that supports the other 3D model is not formed. Therefore, in the present embodiment, in a region including a support region for supporting the other 3D model, out of the region where the specific model for which the shaping is stopped has been planned to be arranged, the shaping material is stacked without the masking process. As a result, it is possible to continue shaping the support body of the other 3D model.

FIGS. 14A and 14B are diagrams for explaining a case where there is an overlapping region in a plurality of footprints, and a specific model also serves as a part of a support body that supports another 3D model.

FIG. 14A represents a state in which shaping is performed in a mode in which a part of the sphere 12 is used for a part of the support region that holds an overhang portion 17a in a 3D model 17. In FIG. 14A, a portion below the overhang portion 17a is a region in which a support body is necessary at the time of shaping. The overhang portion 17a of the 3D model 17 is held by a support body 17b formed in this region and a part of the shaping material constituting the sphere 12. However, when shaping is continued after performing the masking process for stopping the shaping of the sphere 12, there is a concern that the support of the overhang portion 17a will be insufficient. This is because the region corresponding to the portion of the sphere 12 in the support region of the overhang portion 17a is not shaped. Therefore, as shown in FIG. 14B, it is necessary to add a support portion 17c to the region corresponding to the portion of the sphere 12 in the support region of the overhang portion 17a.

To this purpose, when performing the shaping stop process of the sphere 12 as the processing process of slice data, the control unit 2 replaces the next partial region with the cross-sectional data for forming the build material, without performing the masking process of all of the cross-sectional data for forming the sphere 12. That is, the replacement with the cross-sectional data for forming the shaping material is performed with respect to the partial region of the cross-sectional data on the sphere 12 including the region corresponding to the support region of the overhang portion 17a. The shaping material may be a support material. At this time, the footprint of the 3D model 17 may be used. That is, if there is a region overlapping the footprint of the 3D model 17 in the cross-sectional data for forming the structure of the sphere 12, the overlapping region may be replaced with the cross-sectional data for forming a support body holding the overhang portion 17a.

Here, as the processing process of the slice data, the control unit 2 may perform the process including the process of deleting the cross-sectional data on the sphere 12 from the remaining slice data and the process of adding, to the remaining slice data, the cross-sectional data on a new support body for supporting the 3D model 17, the new support body being added instead of the sphere 12.

A method of returning to the layout process of the 3D model, creating slice data on the layout in which the sphere 12 has been deleted, and replacing the slice data at and after the shaping interruption process may also be used as another method for adding the support portion 17c before the slice process.

Figure 15A:
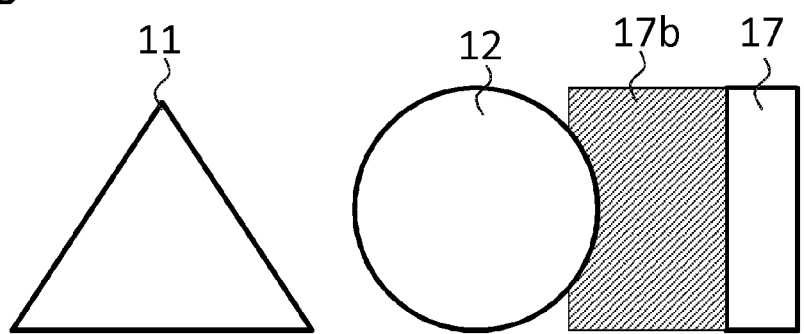
FIGS. 15A and 15B are diagrams for explaining a method for replacing cross-sectional data by using a footprint.
Figure 15B:
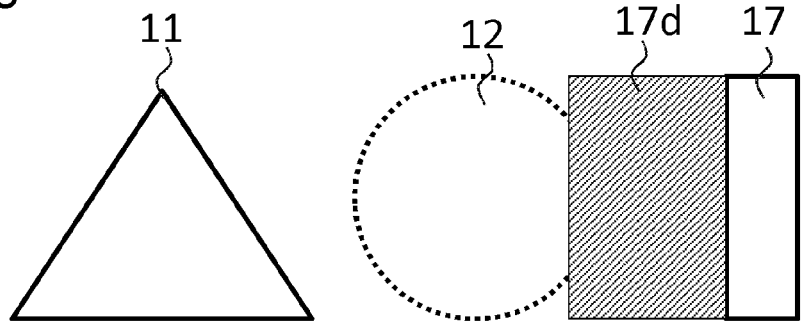

FIGS. 15A and 15B are diagrams for explaining a method for replacing cross-sectional data by using a footprint.

FIG. 15A shows a material layer before reception of a shaping stop instruction relating to the sphere 12; the support body 17b of the 3D model 17 is shown so as to avoid the cross section of the sphere 12. Meanwhile, FIG. 15B illustrates a case where the shaping interruption process is performed by the shaping stop instruction relating to the sphere 12.

In this case, the cross-sectional data on the sphere 12 are subjected to a masking process, but when there is a region overlapping with the footprint of the 3D model 17 in the cross-sectional data on the sphere 12, the overlapping region is used as cross-sectional data for forming a support body for holding the overhang portion 17a. As a result, in the support region of the overhang portion 17a of the material layer, the entire support body 17d is formed in the footprint of the 3D model 17.

A method in which only the portion where the sphere 12 overlaps with the footprint of the 3D model 17 is left and the cross-sectional data on the other portions is masked may be used as another method for forming the support body 17b of the 3D model 17. In this case, the portion 17c originally included in the sphere 12 is fabricated of a build material, but since a support material is arranged between the 3D model 17 and the portion 17c included in the sphere 12, separation is easy. That is, depending on whether the support material is arranged between the 3D model 17 and the portion where the sphere 12 overlaps with the footprint of the 3D model 17, it may be determined whether the portion where the sphere 12 overlaps with the footprint of the 3D model 17 is to be formed of a support material or of a build material.

FIG. 16 is an example of a flowchart of processing executed when shaping of one 3D model is stopped in the case where there are overlapping planar figures when two 3D models are viewed from above. In this example, the overhang portion 17a is entirely formed of a support material.

In step 1601, the control unit 2 reads the footprint of the 3D model (for example, the sphere 12) on which the shaping stop process is performed.

In step 1602, the control unit 2 reads the footprint of the overlapped 3D model (for example, the overhang portion 17a of the 3D model 17).

In step 1603, the control unit 2 inputs the slice data before the shaping stop process is performed.

In step 1604, the control unit 2 determines whether or not the footprint of the sphere 12 is within the footprint of the overhang portion 17a. When the determination in step 1604 is positive, the processing advances to step 1606 in which the control unit 2 replaces the slice data including the cross-sectional data for forming the structure in the footprint of the sphere 12 with the slice data including the cross-sectional data for forming the support body. When the determination in step 1604 is negative, the processing advances to step 1605 in which the control unit 2 masks the cross-sectional data for forming the structure of the sphere 12 with the footprint of the sphere 12 and deletes the masked data.

The above processing is performed for all the slice data to be used for shaping when the shaping is restarted.

As described above, according to the present embodiment, the following effects can be obtained in addition to the effects described in Embodiment 1. That is, when a specific model also serves as a part of the support body that supports another 3D model, the shaping of the support body of another 3D model can be continued even when the shaping of the specific model is stopped.

Embodiment 4

Embodiment 4 will be described below. In the present embodiment, a configuration and a process different from those of Embodiments 1 to 3 will be described, and the explanation of the same configuration and process as in Embodiments 1 to 3 will be omitted.

Described in the present embodiment is a mode in which a new 3D model is additionally shaped in the area on the stage 122 where the 3D model, for which the shaping has been stopped, is arranged. After stopping the shaping of the sphere 12, the 3D model can be newly added and shaped by stacking a support material on the area on the stage 122 where a portion 12a of the sphere 12 which is being shaped has been shaped and forming an area where the shaping can be performed.

FIG. 17 is a diagram for explaining a mode in which a new 3D model is additionally shaped according to the present embodiment.

In the mode shown in FIG. 17, the support material is stacked on the region right above the shaped portion 12a of the sphere 12, which is being shaped on the stage 122, to form an underlaying portion 31, and a new sphere 32 is additionally shaped on the underlaying portion 31. The underlaying portion 31 is stacked until there is an instruction to additionally shape the sphere 32, but stacking is desirably performed till the thickness in the stacking direction becomes equal to or greater than a height predetermined to ensure the strength capable of withstanding the force applied at the time of stacking the layers thereafter, and the peelability from the shaped portion 12a of the sphere 12. Further, when the cross-sectional shape of the portion 12a which is being shaped is small after stopping the shaping of the sphere 12, the region of the underlaying portion 31 may be gradually widened until the size of the footprint is reached. In this case, intermediate process of support calculation may be necessary in some cases.

Figure 18:
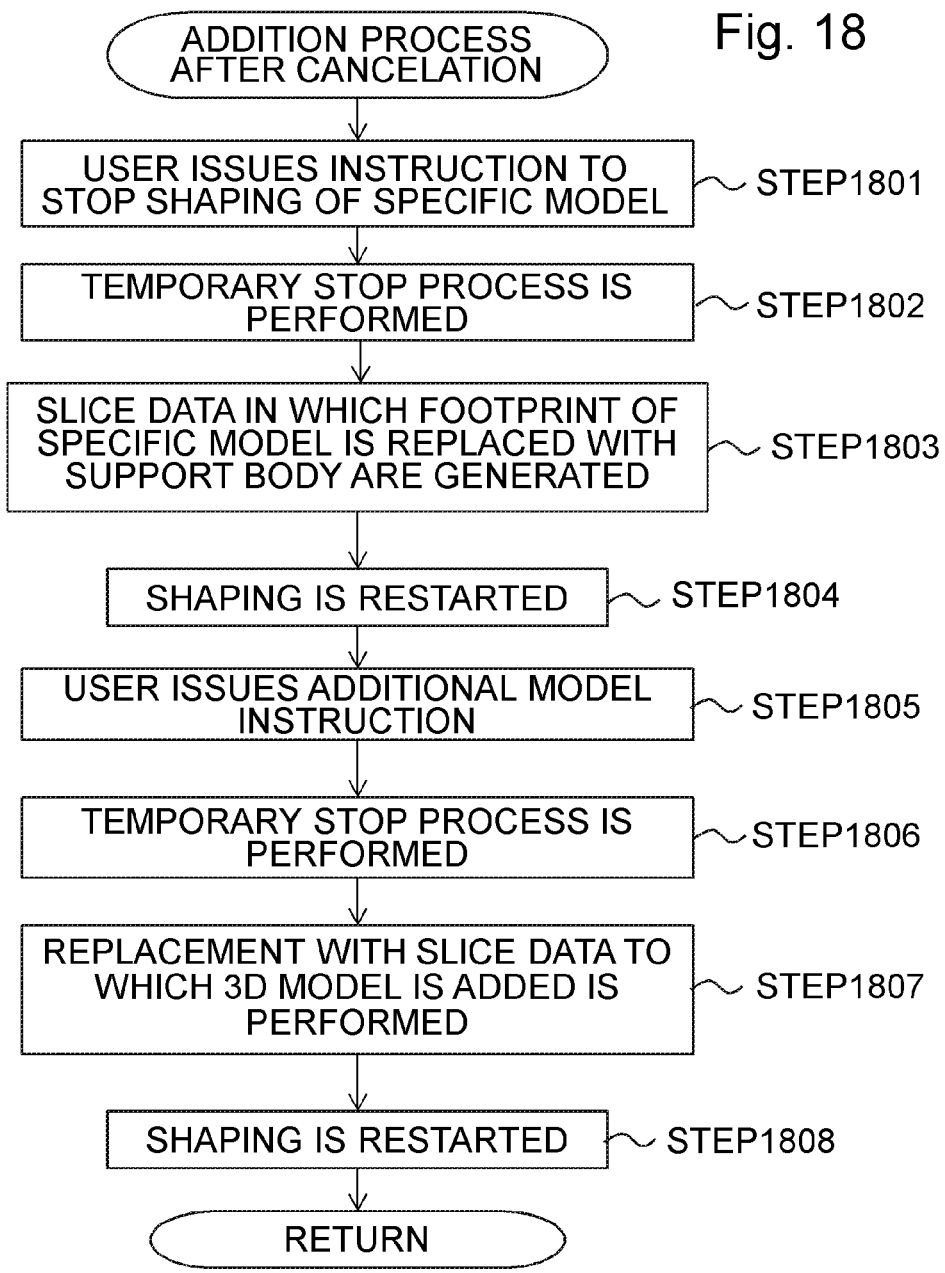
FIG. 18 is a flowchart of a process of performing additional shaping in an area where the shaping has been stopped.

FIG. 18 is a flowchart of a process of additionally shaping a new 3D model in the area on the stage 122 where a specific model, for which the shaping has been stopped, is arranged.

In step 1801, the user designates a 3D model (specific model) for which the shaping is to be stopped.

In step 1802, the control unit 2 performs a temporary stop process of the shaping system 1.

In step 1803, the control unit 2 generates slice data for adding the support body 31 for which the footprint of the specific model, for which the shaping is to be stopped, is taken as the cross-sectional data and replaces the remaining slice data (slice data at and after the shaping stop instruction) as the processing process of the slice data. In Embodiment 1, the footprint of the specific model, for which the shaping is to be stopped, is converted into mask data, whereas in the present embodiment, the footprint is used as the cross-sectional data of the support body to enable the additional shaping of a new 3D model.

In step 1804, the control unit 2 restarts the shaping.

In step 1805, the user instructs to add a new 3D model. However, the 3D model that can be added is limited to those that fit within the range of the footprint of the support body 31. Although not shown in FIG. 18, a step of comparing the footprint of the added 3D model and the footprint of the support body and determining whether the added 3D model fits within the range of the footprint of the support body 31 may be included between the step 1805 and the below-described step 1807.

In step 1806, the control unit 2 performs a temporary stop process of the shaping system 1 in the same manner as in step 1802.

In step 1807, the control unit 2 performs a slice process by laying out a new 3D model in the range of the footprint of the support body 31 and generates slice data including cross-sectional data on the new 3D model. Then, the slice data including the cross-sectional data on the support body 31 generated in step 1803 are replaced with the slice data including the cross-sectional data on the new 3D model.

In step 1808, the control unit 2 restarts the shaping according to the slice data including the cross-sectional data on the new 3D model.

As described above, according to the present embodiment, the following effects can be obtained in addition to the effects described in Embodiment 1. That is, even after the shaping of the specific model is stopped, a new 3D model may be additionally shaped by stacking a support material on the specific model on the stage after the shaping of the specific model has been stopped and forming an area where the shaping can be performed. As a result, it is possible to shorten the shaping time and it is possible to efficiently shape a plurality of 3D models.

Embodiment 5

In Embodiment 4, a case where the shaping of a specific model is stopped, the shaping is restarted, and then the addition of a new 3D model is instructed is described, whereas in the case described in the present embodiment, an instruction to stop the shaping of a specific model and also to add a new 3D model is issued.

Figure 19:
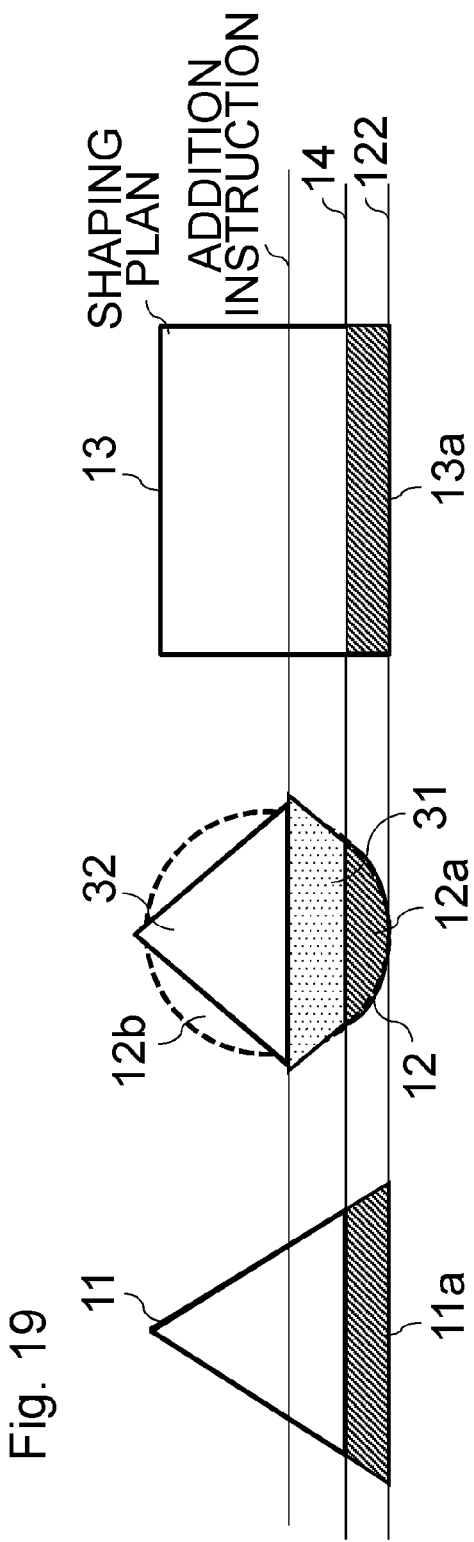
FIG. 19 is a diagram for explaining a mode in which a new 3D model is additionally shaped in Embodiment 5.

FIG. 19 is a diagram for explaining a mode in which a new 3D model is additionally shaped according to the present embodiment.

In the mode shown in FIG. 19, an underlaying portion 31 is formed by stacking a shaping material in a region just above the shaped portion 12a of the sphere 12 which is being shaped on the stage 122, and additionally shaping a new triangular pyramid 32 on the underlaying portion 31. The underlaying portion 31 is stacked upon receiving an instruction to shape the triangular pyramid 32, and the stacking surface wider than the bottom area of the triangular pyramid 32 is formed by gradually increasing the cross-sectional data. At this time, it is desirable that the shape of the underlaying portion 31 be calculated so that the thickness in the stacking direction is able to ensure the strength capable of withstanding the force applied at the time of stacking the layers thereafter. Further, in order to secure the peelability between the underlaying portion 31 and the triangular pyramid 32, it is desirable that a support material be provided at a portion where the underlaying portion 31 and the triangular pyramid 32 contact each other.

Figure 20:
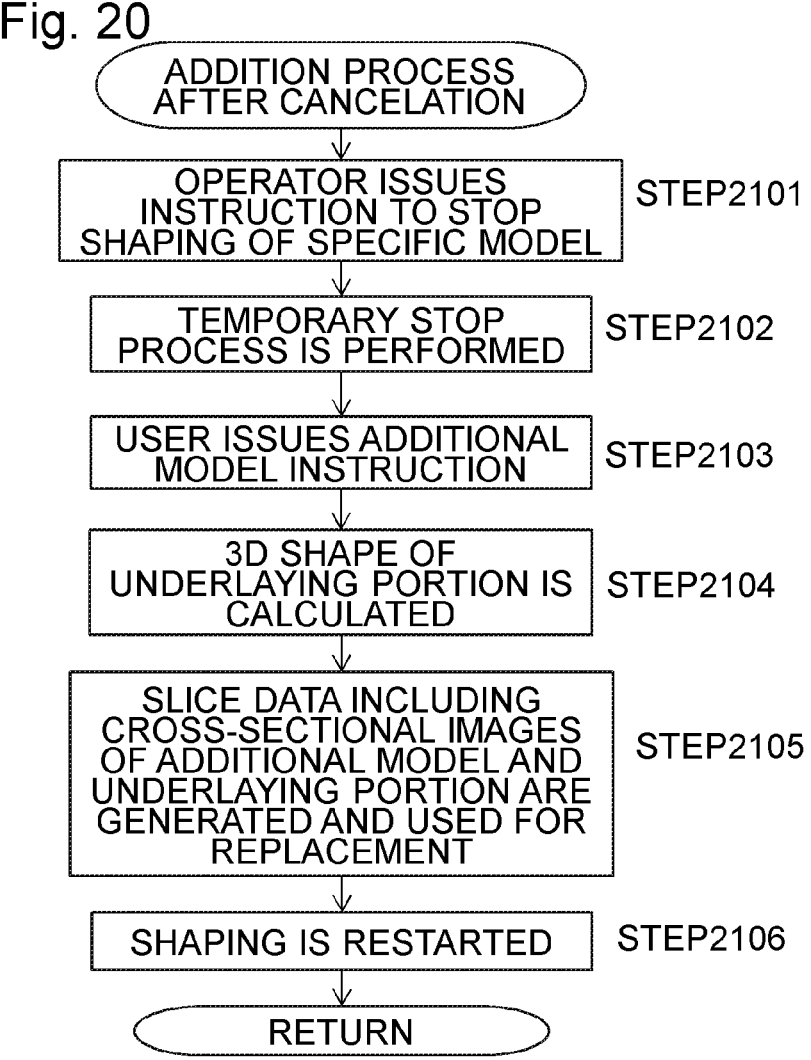
FIG. 20 is a flowchart of a process of additionally shaping a new 3D model in Embodiment 5.

FIG. 20 is a flowchart of a process of additionally shaping a new 3D model in the area on the stage 122 where a specific model, for which the shaping has been stopped, is arranged.

In step 2101, the user designates a 3D model (specific model) for which the shaping is to be stopped.

In step 2102, the control unit 2 performs a temporary stop process of the shaping system 1.

In step 2103, the user instructs to add a new 3D model (additional model).

In step 2104, the control unit 2 calculates the 3D shape of the underlaying portion 31 in consideration of whether or not an additional model can be shaped on the shaped portion 12a of the sphere 12 at the time of receiving the shaping stop instruction. When the additional model can be shaped on the shaped portion 12a, the shape of the underlaying portion 31 is calculated in the same manner as in Embodiment 4. When the upper surface of the shaped portion 12a is smaller than the footprint of the additional model, the shape of the underlaying portion 31 is calculated so that the stacking surface becomes equal to or wider than the footprint of the additional model.

In step 2105, the positions of a triangular pyramid 11 and a rectangular parallelepiped 13 are maintained, and the underlaying portion 31 and the additional model 32 are laid out on the shaped portion of the sphere 12. The 3D model re-laid out in this manner is subjected to a slice process to generate slice data including the cross-sectional data on the underlaying portion 31 and the additional model 32 which are to be used in shaping after the shaping of the sphere 12 is stopped. Further, the slice data including the cross-sectional data on the sphere 12 used before stopping the shaping are replaced.

In step 2106, the control unit 2 restarts the shaping according to the slice data including the cross-sectional data on the underlaying portion 31 and the additional model 32.

According to the present embodiment, the following effects can be obtained in addition to the effects described in Embodiment 1. That is, a new 3D model can be additionally shaped by stacking the shaping material and forming an area where the shaping can be performed on the specific model on the stage after stopping the shaping according to the shape of the 3D model to be added. As a result, it is possible to shorten the shaping time and it is possible to efficiently shape a plurality of 3D models.

Embodiment 6

In Embodiments 1-5, in the step of shaping a plurality of 3D models, the case of stopping the shaping of a specific 3D model and the case of adding a new 3D model has been described, but the present invention is not limited to these cases.

For example, there is a case where the shaping is stopped while one 3D model is being shaped, and the shape to be shaped thereafter or the shaping material is partially changed. Specifically, upon receipt of an instruction to change the shaping object, the slice number N of the stacked material layers is read out and stored. Then, while maintaining the arrangement of the 3D model which is being shaped, the 3D data at and after the slice number (N+1) of the 3D model reflecting the change are acquired and slice data are generated. As a result, it is possible to change the shape of the 3D model to be fabricated or the shaping material while making full use of the already shaped portion.

(Shaping System)

FIG. 21 is a diagram for explaining the shaping system 1 that can fabricate a shaping object. Hereinafter, a method for forming a shaping object by the stacking method using the image forming unit 100 will be described.

In the image forming unit 100, a material image for one layer is formed by using the slice data generated by the control unit 2.

The image forming unit 100 generates an image by using an electrophotographic method, and photosensitive drums 101, 102, 103, 104 are provided along the rotation direction of an endless carrier belt 109. Further, transfer rollers 105, 106, 107, 108 are provided so as to face the respective photosensitive drums with the carrier belt 109 being interposed therebetween. Here, the photosensitive drum 101 and the transfer roller 105 are for forming a material image by using a support material accommodated in a cartridge D. Further, the photosensitive drum 102 and the transfer roller 106 are for forming a material image by using a green build material accommodated in a cartridge C. The photosensitive drum 103 and the transfer roller 107 are for forming a material image by using a blue build material accommodated in a cartridge B. The photosensitive drum 104 and the transfer roller 108 are for forming a material image by using a red build material accommodated in the cartridge A.

The image forming operation performed by the image forming unit 100 will be described hereinbelow. First, electrostatic latent images for arranging the materials of the cartridges A to D are formed on the photosensitive drums 101 to 104 in accordance with the slice data, which have been generated by the control unit 2, by charging and exposure performed by a charging device and an optical system which are not shown in the figure. Material images are formed by supplying and adhering the shaping materials to the electrostatic latent images formed on the photosensitive drums. The material images formed on the respective photosensitive drums are sequentially transferred onto the carrier belt 109 sandwiched between the photosensitive drums and the transfer rollers, and a material image is formed on the carrier belt 109.

The transfer unit 110 transfers the material image formed on the carrier belt 109 in the image forming unit 100 to a carrier belt 114 in the transfer unit 110 by the transfer roller 111 on the image forming unit side and the transfer roller 112 on the transfer unit side.

The material image transferred to the carrier belt 114 in the transfer unit 110 is heated by a heater 113 and thermally welded to a shaping object 121 on the stage 122 in a shaping unit 120. The stage 122 is configured to be capable of moving a stage moving table 123 in synchronization with the carrier belt 114 during thermal welding. Further, the stage moving table 123 is configured to be lowered in the direction of an arrow according to the stacking thickness of the material image.

Further, when the material image on the carrier belt 114 is thermally welded to the shaping object 121 on the stage 122, a shaping object with a higher strength can be fabricated by using a feature of applying a pressure in the direction indicated by an arrow 130 in FIG. 21.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to change the three-dimensional model while fabricating a solid object, to suppress wasteful consumption of a shaping material, and shorten the shaping time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A shaping method for performing shaping of a shaping target by stacking a shaping material on a stage on the basis of three-dimensional model data,
   wherein the three-dimensional model data includes data on a plurality of three-dimensional models, and
   wherein in a case where an instruction to stop fabrication of a specific three-dimensional model among the plurality of three-dimensional models is received during shaping of the shaping target according to the plurality of three-dimensional models, (1) a process of generating data by deleting data of the specific three-dimensional model from data to be used for the shaping after the instruction is received is performed, and (2) the shaping of the shaping target is continued on the basis of data in which the data of the specific three-dimensional model has been deleted.

2. The shaping method according to claim 1, wherein the shaping target is shaped by stacking the shaping material according to slice data generated by slicing the three-dimensional model data in a predetermined direction, and
   wherein the process of generating the data by deleting the data of the specific three-dimensional model from the data to be used for the shaping after the instruction is received includes a process of deleting data of the specific three-dimensional model from remaining slice data to be used for the shaping of the shaping target after the receiving of the instruction.

3. The method for shaping according to claim 2, wherein the process of deleting the data of the specific three-dimensional model from the remaining slice data is a process of masking the remaining slice data by using mask data that mask a region of the specific three-dimensional model.

4. The shaping method according to claim 3, wherein the mask data are data for masking a projection shape in a case where it is assumed that the specific three-dimensional model is projected on a surface on which the shaping material is stacked.

5. A shaping apparatus that performs shaping of a shaping target, the shaping apparatus comprising:
   a shaping unit configured to perform stacking of a shaping material on a stage on the basis of slice data; and
   unit
   a control unit including a data processing unit and an input unit,
   wherein when the control unit receives an instruction to stop fabrication of a specific three-dimensional model among a plurality of three-dimensional models while the shaping unit is performing shaping of the shaping target according to the plurality of three-dimensional models, (1) the control unit generates slice data, to be used for the shaping after the control unit receives the instruction, in which data of the specific three-dimensional model is deleted, and (2) the shaping unit continues the stacking of the shaping material on the basis of the slice data in which the data of the specific three-dimensional model has been deleted.

6. The shaping apparatus according to claim 5, wherein when the control unit receives the instruction, the control unit performs masking on remaining slice data to be used for the shaping of the shaping target after the control unit receives the instruction by using mask data that masks a region of the specific three-dimensional model.

7. The shaping apparatus according to claim 6, wherein the mask data are data for masking a projection shape in a case where it is assumed that the specific three-dimensional model is projected on the stage.

8. A shaping method for performing shaping of a shaping target by stacking a shaping material on a stage on the basis of three-dimensional model data, the shaping method comprising:
   a step of receiving an instruction to stop fabrication of a specific shaping target during shaping of a plurality of shaping targets at the same time on the stage; and
   a step of stopping the fabrication of the specific shaping target and of continuing fabrication of a remaining shaping target.

9. The shaping method according to claim 8, wherein the shaping material is stacked on the basis of slice data obtained by slicing the three-dimensional model data into a plurality of layers in a direction in which the shaping material is stacked.

* * * * *